US012462768B2

(12) United States Patent
Zhang et al.

(10) Patent No.: US 12,462,768 B2
(45) Date of Patent: Nov. 4, 2025

(54) GATE DRIVING CIRCUIT HAVING FIRST SUPPRESSION MODULE, DISPLAY PANEL, DRIVING METHOD AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhengxin Zhang, Beijing (CN); Lei Guo, Beijing (CN); Jiali Zhang, Beijing (CN); Hanqing Liu, Beijing (CN); Ye Wang, Beijing (CN); Junrui Cui, Beijing (CN); Qiang Wang, Beijing (CN); Wei Tang, Beijing (CN); Pengju Zhang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/000,279

(22) PCT Filed: Apr. 22, 2022

(86) PCT No.: PCT/CN2022/088520
§ 371 (c)(1),
(2) Date: Nov. 29, 2022

(87) PCT Pub. No.: WO2023/201715
PCT Pub. Date: Oct. 26, 2023

(65) Prior Publication Data
US 2025/0037677 A1 Jan. 30, 2025

(51) Int. Cl.
G09G 3/36 (2006.01)
G06F 3/041 (2006.01)
(Continued)

(52) U.S. Cl.
CPC .......... *G09G 3/3677* (2013.01); *G06F 3/041* (2013.01); *G09G 3/20* (2013.01);
(Continued)

(58) Field of Classification Search
CPC ......... G09G 3/3677; G09G 2300/0426; G09G 2310/0286; G09G 2320/20;
(Continued)

(56) References Cited

U.S. PATENT DOCUMENTS

2008/0101529 A1* 5/2008 Tobita .................. G09G 3/3677
377/64
2014/0093028 A1* 4/2014 Wu ........................ G11C 19/28
377/64

(Continued)

FOREIGN PATENT DOCUMENTS

CN 103927998 A 7/2014
CN 103198783 B 4/2015
(Continued)

OTHER PUBLICATIONS

Song, E. et al., "Depletion Mode Oxide TFT Shift Register for Variable Frame Rate AMOLED Displays," IEEE Electron Device Letters, vol. 36, No. 3, Mar. 2015, 3 pages.

*Primary Examiner* — Adam J Snyder
(74) *Attorney, Agent, or Firm* — McCoy Russell LLP

(57) ABSTRACT

The present disclosure provides a gate driving circuit, a display panel, a driving method and a display device. The gate driving circuit includes an input module, a pull-up node, an output module, a first pull-down node, a first pull-down node control module and a first suppression module. The first pull-down node control module controls to connect the first connection node and the first pull-down node under the control of the pull-up node, and inputs the signal provided by the second signal terminal to the first
(Continued)

pull-down node under the control of the potential of the first pull-down node; the first suppression module inputs the signal provided by the first level signal terminal to the first connection node under the control of the pull-up node.

18 Claims, 17 Drawing Sheets

(51) Int. Cl.
*G09G 3/20* (2006.01)
*G11C 19/28* (2006.01)

(52) U.S. Cl.
CPC .............. *G09G 2300/0426* (2013.01); *G09G 2310/0286* (2013.01); *G09G 2320/02* (2013.01); *G09G 2320/041* (2013.01); *G09G 2320/043* (2013.01); *G11C 19/28* (2013.01)

(58) Field of Classification Search
CPC ....... G09G 2320/041; G09G 2320/043; G09G 3/20; G06F 3/041; G11C 19/28
See application file for complete search history.

(56) References Cited

U.S. PATENT DOCUMENTS

| | | | |
|---|---|---|---|
| 2015/0036784 A1 | 2/2015 | Qing et al. | |
| 2016/0064097 A1* | 3/2016 | Yang | G09G 5/00 377/64 |
| 2016/0360382 A1 | 12/2016 | Gross et al. | |
| 2018/0046308 A1 | 2/2018 | Xiao et al. | |
| 2018/0329547 A1 | 11/2018 | Wu et al. | |
| 2020/0058362 A1 | 2/2020 | Ku et al. | |
| 2020/0135287 A1* | 4/2020 | Han | G09G 3/3677 |
| 2020/0312259 A1 | 10/2020 | Huang | |
| 2021/0201807 A1 | 7/2021 | Feng et al. | |
| 2021/0217342 A1* | 7/2021 | Hu | G09G 3/20 |
| 2021/0280651 A1 | 9/2021 | Wang et al. | |
| 2021/0335305 A1 | 10/2021 | Mi et al. | |

FOREIGN PATENT DOCUMENTS

| | | | | |
|---|---|---|---|---|
| CN | 105513550 A | | 4/2016 | |
| CN | 105702294 A | | 6/2016 | |
| CN | 106333667 A | | 1/2017 | |
| CN | 107301833 A | | 10/2017 | |
| CN | 107452425 A | | 12/2017 | |
| CN | 108831403 A | | 11/2018 | |
| CN | 109256075 A | | 1/2019 | |
| CN | 109637430 A | * | 4/2019 | ............... G09G 3/20 |
| CN | 109817144 A | | 5/2019 | |
| CN | 105702294 B | | 9/2019 | |
| CN | 110428789 A | | 11/2019 | |
| CN | 110503921 A | | 11/2019 | |
| CN | 109935187 B | | 8/2020 | |
| CN | 108389542 B | | 1/2021 | |
| CN | 112185316 A | | 1/2021 | |
| CN | 112687229 A | | 4/2021 | |
| CN | 112905276 A | | 6/2021 | |
| CN | 113113070 A | | 7/2021 | |
| CN | 114241992 A | | 3/2022 | |
| JP | 2014153532 A | | 8/2014 | |

\* cited by examiner

US 12,462,768 B2

GATE DRIVING CIRCUIT HAVING FIRST SUPPRESSION MODULE, DISPLAY PANEL, DRIVING METHOD AND DISPLAY DEVICE

CROSS REFERENCE TO RELATED APPLICATION

The present application is a U.S. National Phase of International Application No. PCT/CN2022/088520 entitled "GATE DRIVING CIRCUIT, DISPLAY PANEL, DRIVING METHOD AND DISPLAY DEVICE," and filed on Apr. 22, 2022. The entire contents of the above-listed applications are hereby incorporated by reference for all purposes.

TECHNICAL FIELD

The present disclosure relates to the field of display technology, in particular to a gate driving circuit, a display panel, a driving method and a display device.

BACKGROUND

With the development of display technology, wearable display products are becoming more and more popular. Wearable display products can be directly worn on the body or integrated into the user's clothing accessories. Such products can achieve powerful functions through software support and data interaction, such as smart bracelet can not only be used as a watch to display the time, but also can be used to monitor physical signs, interact with mobile devices, etc. Wearable display products are in a sleep state when it is not in operation, and will be woken up when it is in operation. Because wearable products perform frequently wake-up actions, and due to the influence of temperature and time of use, jitter and horizontal stripes may occur for the wearable products, which affects the display quality.

SUMMARY

In a first aspect, an embodiment of the present disclosure is to provide a gate driving circuit, including: an input module, a pull-up node, an output module, a first pull-down node, a first pull-down node control module and a first suppression module; wherein the input module is electrically connected to an input control terminal, a first input terminal and the pull-up node respectively, and is configured to input a signal inputted by the first input terminal into the pull-up node under the control of a first input control terminal; the output module is electrically connected to the pull-up node, a first signal terminal and an output terminal respectively, and is configured to output a signal inputted by the first signal terminal through the output terminal under the control of a potential of the pull-up node; the first pull-down node control module is electrically connected to a second signal terminal, a first pull-down control node, a first pull-down node, the pull-up node and a first connection node, respectively, and is configured to control a potential of the first pull-down control node under the control of the second signal terminal and the potential of the pull-up node, and is configured to control to connect the first connection node and the first pull-down node under the control of the potential the pull-up node, and is configured to input a signal provided by the second signal terminal to the first pull-down node under the control of the potential of the first pull-down node; the first suppression module is respectively electrically connected to the pull-up node, the first connection node and a first level signal terminal, and is configured to input a signal provided by the first level signal terminal to the first connection node under the control of the potential of pull-up node.

Optionally, the first suppression module includes a first sub-circuit; the first sub-circuit is electrically connected to the pull-up node, the first connection node and the first level signal terminal respectively, and is configured to input the signal inputted by the first level signal terminal into the first connection node under the control of the potential of the pull-up node.

Optionally, the first pull-down node control module is electrically connected to the second connection node, and is configured to input the signal provided by the second signal terminal to the first pull-down control node under the control of the second signal terminal, and control to connect the first pull-down control node and the second connection node under the control of the potential of the pull-up node; the first suppression module is also electrically connected to the second connection node, is configured to input the signal provided by the first level signal terminal to the second connection node under the control of the potential of the pull-up node.

Optionally, the first suppression module further includes a second sub-circuit, the second sub-circuit is respectively connected to the pull-up node, the second connection node and the first level signal terminal, and is configured to input the signal inputted by the first level signal terminal to the second connection node under the control of the potential of the pull-up node.

Optionally, the gate driving circuit further includes a first noise reduction module; wherein the first noise reduction module is electrically connected to the pull-up node, the output terminal, the first pull-down node and the first level signal terminal, respectively, and is configured to input the signal provided by the first level signal terminal to the pull-up node and/or the output terminal under the control of the potential of the first pull-down node.

Optionally, the gate driving circuit further includes a reset module, wherein the reset module is electrically connected to the pull-up node, the second input terminal and the reset signal terminal respectively, and is configured to input the signal inputted by the second input terminal to the pull-up node under the control of the reset signal terminal.

Optionally, the gate driving circuit further includes a pull-down maintenance module, wherein the pull-down maintenance module is electrically connected to the output terminal, the third signal terminal and the first level signal terminal respectively, and is configured to input the signal inputted by the first level signal terminal to the output terminal under the control of the third signal terminal.

Optionally, the gate driving circuit further includes an initial reset module, wherein the initial reset module is electrically connected to the pull-up node, an initial signal terminal, and the first level signal terminal, respectively, and is configured to input the signal inputted by the first level signal terminal to the pull-up node under the control of the initial signal terminal.

Optionally, the input module comprises a first transistor, a gate electrode of the first transistor is electrically connected to the input control terminal, a first electrode of the first transistor is electrically connected to the first input terminal, and a second electrode of the first transistor is electrically connected to the pull-up node.

Optionally, the output module comprises a second transistor and a first capacitor; a gate electrode of the second transistor is electrically connected to the pull-up node, a first electrode of the second transistor is electrically connected to the first signal terminal, and a second electrode of the second transistor is electrically connected to the output terminal; a first electrode plate of the first capacitor is electrically connected to the pull-up node, and a second electrode plate of the first capacitor is electrically connected to the output terminal.

Optionally, the first pull-down node control module comprises a third transistor, a fourth transistor, a fifth transistor and a sixth transistor; a gate electrode of the sixth transistor and a first electrode of the sixth transistor are both electrically connected to the second signal terminal, and a second electrode of the sixth transistor is electrically connected to a gate electrode of the third transistor; the gate electrode of the third transistor is electrically connected to the first pull-down control node; a first electrode of the third transistor is electrically connected to the second signal terminal, and a second electrode of the third transistor is electrically connected to the first pull-down node; a gate electrode of the fourth transistor is electrically connected to the pull-up node, a first electrode of the fourth transistor is electrically connected to the first pull-down node, and a second electrode of the fourth transistor is electrically connected to the first connection node; a gate electrode of the fifth transistor and the gate electrode of the fourth transistor are both electrically connected to the pull-up node, and a first electrode of the fifth transistor and the second electrode of the sixth transistor are both electrically connected to the gate electrode of the third transistor, and a second electrode of the fifth transistor is electrically connected to the second connection node.

Optionally, the gate driving circuit further comprises a first noise reduction module; the first noise reduction module includes a seventh transistor and an eighth transistor; a gate electrode of the seventh transistor is electrically connected to the first pull-down node, a first electrode of the seventh transistor is electrically connected to the pull-up node, and a second electrode of the seventh transistor is electrically connected to the first level signal terminal; a gate electrode of the eighth transistor is electrically connected to the first pull-down node, a first electrode of the eighth transistor is electrically connected to the output terminal, and a second electrode of the eighth transistor is electrically connected to the first level signal terminal.

Optionally, the first sub-circuit comprises a ninth transistor, a gate electrode of the ninth transistor is electrically connected to the pull-up node, and a first electrode of the ninth transistor is electrically connected to a second electrode of the fourth transistor, and a second electrode of the ninth transistor is electrically connected to the first level signal terminal.

Optionally, the first suppression module further comprises a second sub-circuit, the second sub-circuit comprises a tenth transistor, a gate electrode of the tenth transistor is electrically connected to the pull-up node and the gate electrode of the ninth transistor, and a first electrode of the tenth transistor is electrically connected to the second electrode of the fifth transistor, and a second electrode of the tenth transistor is electrically connected to the first level signal terminal.

Optionally, the reset module includes an eleventh transistor, a gate electrode of the eleventh transistor is electrically connected to the reset signal terminal, and a first electrode of the eleventh transistor is electrically connected to the pull-up node, a second electrode of the eleventh transistor is electrically connected to the second input terminal.

Optionally, the pull-down maintenance module includes a twelfth transistor, a gate electrode of the twelfth transistor is electrically connected to the third signal terminal, and a first electrode of the twelfth transistor is electrically connected to the output terminal, and a second electrode of the twelfth transistor is electrically connected to the first level signal terminal.

Optionally, the initial reset module includes a thirteenth transistor, a gate electrode of the thirteenth transistor is electrically connected to the initial signal terminal, and a first electrode of the thirteenth transistor is electrically connected to the pull-up node, and a second electrode of the thirteenth transistor is electrically connected to the first level signal terminal.

Optionally, the gate driving circuit further includes a second pull-down node control module, a second pull-down node, a second noise reduction module and a second suppression module; wherein the second pull-down node control module is respectively electrically connected to a fourth signal terminal, the second pull-down node, a second pull-down control node, the pull-up node, a third connection node and a fourth connection node, and is configured to input a signal provided by the fourth signal terminal to the second pull-down control node under the control of the fourth signal terminal, and control to connect the second pull-down control node and the fourth connection node under the control of the potential of the pull-up node, and input the signal provided by the fourth signal terminal to the second pull-down node under the control of a potential of the second pull-down control node, and control to connect the second pull-down node and the third connection node under the control of the potential of the pull-up node; the second noise reduction module is respectively electrically connected to the pull-up node, the output terminal, the second pull-down node and the first level signal terminal, and is configured to input the signal provided by the first level signal terminal to the pull-up node and/or the output terminal under the control of the potential of the second pull-down node; the second suppression module is electrically connected to the pull-up node, the third connection node, and the first level signal terminal, respectively, and is configured to input the signal provided by the first level signal terminal to the third connection node under the control of the potential of the pull-up node.

Optionally, the second suppression module comprises a third sub-circuit, the third sub-circuit is respectively connected to the pull-up node, the third connection node and the first level signal terminal, is configured to input the signal inputted by the first level signal terminal to the third connection node under the control of the potential of the pull-up node.

Optionally, the second suppression module is further electrically connected to the fourth connection node, and is configured to input the signal provided by the first level signal terminal to the fourth connection node under the control of the potential of the pull-up node; the second suppression module further includes a fourth sub-circuit, the fourth sub-circuit is respectively electrically connected to the pull-up node, the fourth connection node and the first level signal terminal, and is configured to input the signal provided by the first level signal terminal to the fourth connection node under the control of the potential of the pull-up node.

Optionally, the second pull-down node control module comprises a fourteenth transistor, a fifteenth transistor, a sixteenth transistor and a seventeenth transistor; a gate electrode of the seventeenth transistor and a first electrode of the seventeenth transistor are both electrically connected to a fourth signal terminal, and a second electrode of the seventeenth transistor is electrically connected to a gate electrode of the fourteenth transistor; the second electrode of the seventeenth transistor is electrically connected to the second pull-down control node; a first electrode of the fourteenth transistor is electrically connected to the fourth signal terminal, and a second electrode of the fourteenth transistor is electrically connected to the second pull-down node; a gate electrode of the fifteenth transistor is electrically connected to the pull-up node, a first electrode of the fifteenth transistor is electrically connected to the second pull-down node, and a second electrode of the fifteenth transistor is electrically connected to the third connection node; a gate electrode of the sixteenth transistor is electrically connected to the gate electrode of the fifteenth transistor and the pull-up node, and a first electrode of the sixteenth transistor is connected to the second electrode of the seventeenth transistor and the gate electrode of the fourteenth transistor, and a second electrode of the sixteenth transistor is electrically connected to the fourth connection node.

Optionally, the third sub-circuit comprises an eighteenth transistor and the fourth sub-circuit comprises a nineteenth transistor; a gate electrode of the eighteenth transistor is electrically connected to the pull-up node, a first electrode of the eighteenth transistor is electrically connected to the second electrode of the fifteenth transistor, and a second electrode of the eighteenth transistor is electrically connected to the first level signal terminal; a gate electrode of the nineteenth transistor is electrically connected to the pull-up node and the gate electrode of the eighteenth transistor, and a first electrode of the nineteenth transistor is electrically connected to the second electrode of the sixteenth transistor, and a second electrode of the nineteenth transistor is electrically connected to the first level signal terminal.

Optionally, the second noise reduction module comprises a twentieth transistor and a twenty-first transistor; a gate electrode of the twentieth transistor is electrically connected to the second pull-down node, a first electrode of the twentieth transistor is electrically connected to the pull-up node, and a second electrode of the twentieth transistor is electrically connected to the first level signal terminal; a gate electrode of the twenty-first transistor is electrically connected to the second pull-down node, a first electrode of the twenty-first transistor is electrically connected to the output terminal, and a second electrode of the twenty-first transistor is electrically connected to the first level signal terminal.

In a second aspect, an embodiment of the present disclosure provides a shift register comprising a plurality of gate driving circuits connected in series.

In a third aspect, an embodiment of the present disclosure provides a display panel comprising the shift register.

In a fourth aspect, an embodiment of the present disclosure provides a method for driving a display panel, wherein a working period of the display panel includes a wake-up phase, the wake-up phase includes a first phase, a conversion phase and a second phase, and the first phase is a phase where no data signal is written to the display panel, and the second phase is a phase where the data signal is written to the display panel; the display panel includes a plurality of gate driving circuits connected in series, the gate driving circuits include an input module, a pull-up node, an output module, a first pull-down node and a first pull-down node control module; the input module is electrically connected to an input control terminal, a first input terminal and the pull-up node respectively, and is configured to input a signal inputted by the first input terminal into the pull-up node under the control of a first input control terminal; the output module is electrically connected to the pull-up node, a first signal terminal and an output terminal respectively, and is configured to output a signal inputted by the first signal terminal through the output terminal under the control of a potential of the pull-up node; the first pull-down node control module is electrically connected to a second signal terminal, a first pull-down control node, a first pull-down node, the pull-up node, a first connection node and a second connection node, respectively, and is configured to input a signal provided by the second signal terminal to the first pull-down control node under the control of the second signal terminal, and control to connect the first pull-down control node and the second connection node under the control of the potential of the pull-up node, and input the signal provided by the second signal terminal to the first pull-down node under the control of a potential of the first pull-down control node and control to connect the first pull-down node and the first connection node under the control of the potential of the pull-up node; the driving method of the display panel includes: during at least a part of the conversion phase, inputting an active level to the second signal terminal under the control of a trigger signal, so that the first pull-down node control module controls to pull up the potential of the first pull-down node.

Optionally, the method includes: during the conversion phase, inputting the active level to the second signal terminal under the control of the trigger signal.

Optionally, the gate driving circuit further comprises a second pull-down node control module; the method further includes: when the active level is inputted to the second signal terminal, controlling, by the second pull-down node control module, to pull up the potential of the second node.

Optionally, the inputting an active level to the second signal terminal under the control of a trigger signal includes: converting the trigger signal from a first voltage signal to a second voltage signal, to control to input the active level to the second signal terminal.

In a fifth aspect, an embodiment of the present disclosure provides a display device, wherein the display device further comprises a driver chip, the driver chip comprises a trigger signal generating module and a signal providing module; the trigger signal generating module is configured to generate a trigger signal to the signal providing module; the signal providing module is configured to control to input an active level to the second signal terminal under the control of the trigger signal during at least part of the conversion phase, so that the first pull-down node control module pulls up the potential of the first pull-down node.

DETAILED DESCRIPTION

Figure 1:
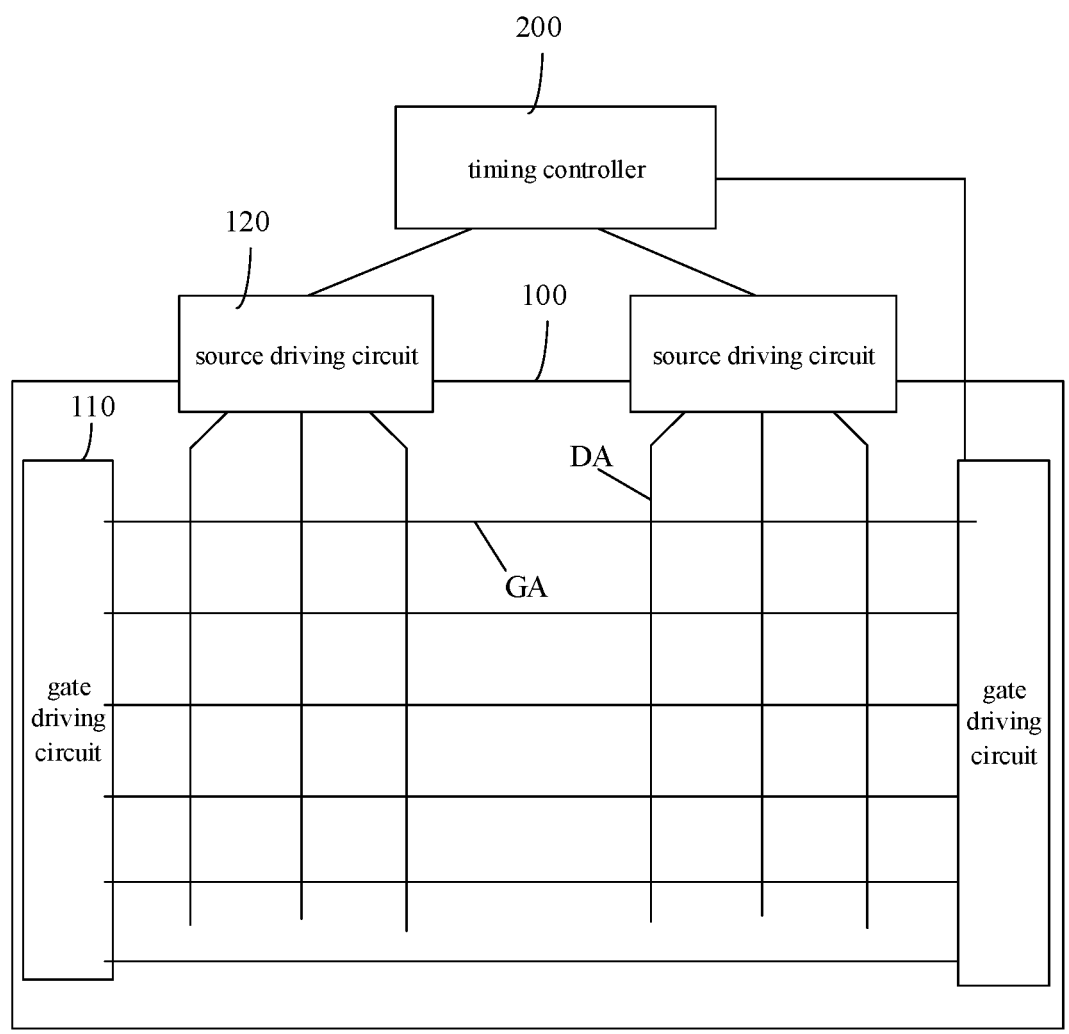
FIG. 1 is a structural diagram of a display panel in a related art.

In order to make the purpose, technical solutions and advantages of the embodiments of the present disclosure more clear, the technical solutions of the embodiments of the present disclosure will be clearly and completely described below with reference to the accompanying drawings of the embodiments of the present disclosure. Obviously, the described embodiments are some, but not all, embodiments of the present disclosure. Also, the embodiments of the present disclosure and the features of the embodiments may be combined with each other when there is no conflict. Based on the described embodiments of the present disclosure, all other embodiments obtained by those of ordinary skill in the art without creative efforts fall within the protection scope of the present disclosure.

Unless otherwise defined, technical or scientific terms used in this disclosure shall have the ordinary meaning as understood by one of ordinary skill in the art to which this disclosure belongs. As used in this disclosure, "first," "second," and similar terms do not denote any order, quantity, or importance, but are merely used to distinguish the various components. "Including" or "comprising" and similar words mean that the elements or things appearing before the word encompass the elements or things recited after the word and their equivalents, but do not exclude other elements or things. Words "connected" or "coupled" are not limited to physical or mechanical connections, but may include electrical connections, whether direct or indirect.

It should be noted that the sizes and shapes in the accompanying drawings do not reflect the actual scale, and are only intended to illustrate the present disclosure. And the same or similar reference numerals refer to the same or similar elements or elements having the same or similar functions throughout.

In the embodiment of the present disclosure, when the transistor is a thin film transistor or a metal-oxide-semiconductor (MOS) transistor, the first electrode may be the drain electrode, and the second electrode may be the source electrode; or the first electrode may be the source electrode, the second electrode can be the drain electrode.

Figure 2:
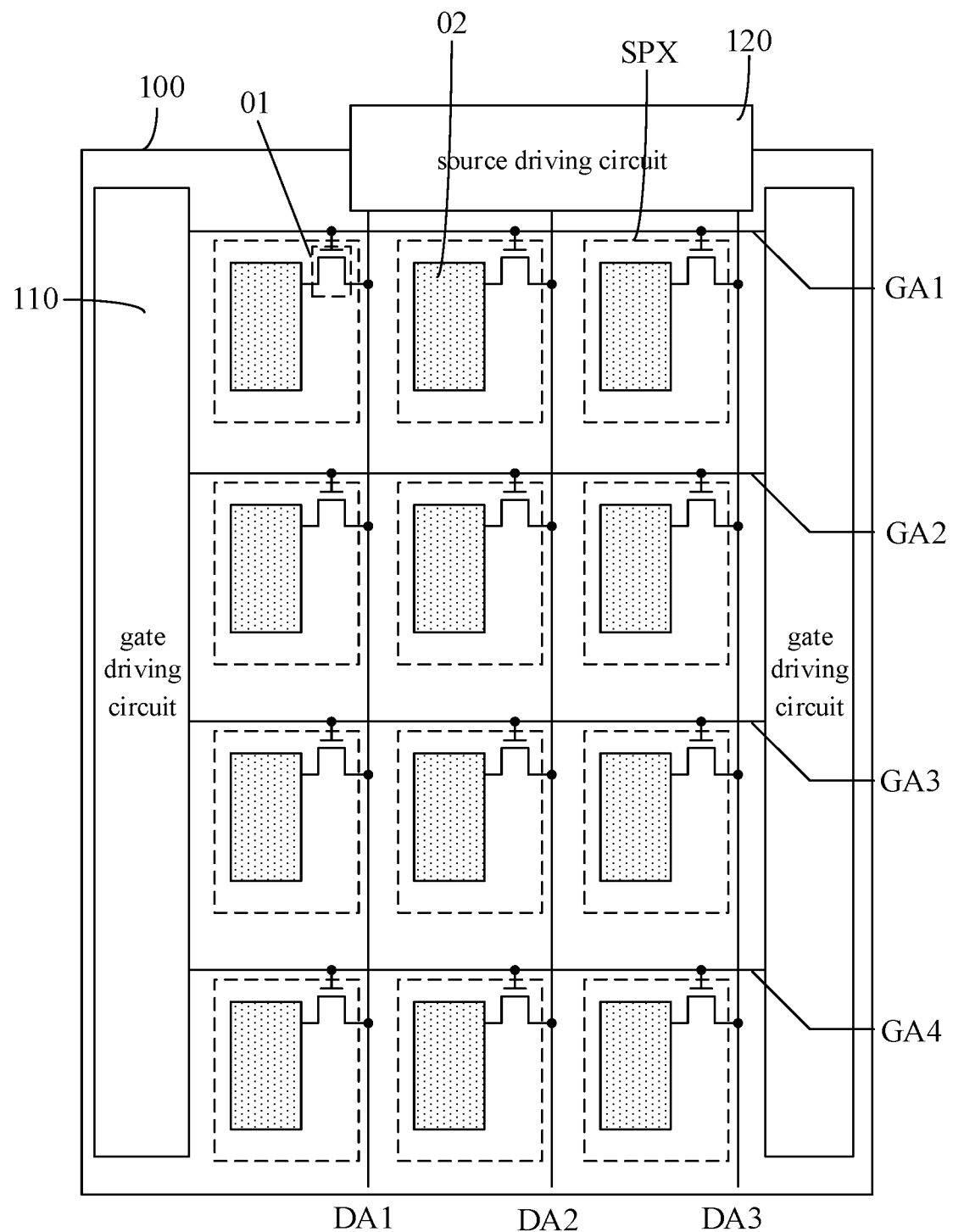
FIG. 2 is a structural diagram of a display panel in a related art.

Referring to FIG. 1 and FIG. 2, the display device may include a display panel 100 and a timing controller 200. The display panel 100 may include a plurality of pixel units arranged in an array, a plurality of gate lines GA (for example, a first row gate line GA1, a second row gate line GA2, a third row gate line GA3, and a fourth row gate line GA4), a plurality of data lines DA (e.g., a first column data line DA1, a second column data line DA2, and a third column data line IanDA3), a gate driving circuit 110 and a source driving circuit 120. The gate driving circuit 110 is respectively coupled to the first row gate line GA1, the second row gate line GA2, the third row gate line GA3 and the fourth row gate line GA4, and the source driving circuit 120 is respectively coupled to the first column data line DA1, the second column data line DA2 and the third column data line DA3. The timing controller 200 may input a control signal to the gate driving circuit 110 through a level shift circuit, thereby driving the first row gate line GA1, the second row gate line GA2, the third row gate line GA3, and the fourth row gate line GA4. The timing controller 200 inputs a signal to the source driving circuit 120 so that the source driving circuit 120 inputs a data voltage to the data line, thereby charging the sub-pixel SPX, so that the sub-pixel SPX inputs a corresponding data voltage to realize the image display function. Exemplarily, the number of source driving circuits 120 may be set to 2, wherein one source driving circuit 120 is connected to half of the data lines, and the other source driving circuit 120 is connected to the other half of the data lines. Of course, the number of source driving circuits 120 can also be set to 1, 3, 4, or more, which can be designed and determined according to actual application requirements, which is not limited here. The gate driving circuit is arranged on both sides of the display panel to realize bilateral driving. Of course, the gate driving circuit can also be arranged on one side of the display panel, or on both sides of the display panel, but is used to drive display in different rows, which is not limited.

Exemplarily, each pixel unit includes a plurality of sub-pixels SPX. For example, the pixel unit may include a red sub-pixel, a green sub-pixel and a blue sub-pixel, so that red, green and blue colors can be mixed to realize color display. Alternatively, the pixel unit may also include a red sub-pixel, a green sub-pixel, a blue sub-pixel and a white sub-pixel, so that red, green, blue and white colors can be mixed to realize color display. Of course, in practical applications, the colors of the sub-pixels in the pixel unit can be designed and determined according to the actual application environment, which is not limited here.

Referring to FIG. 2, each sub-pixel SPX includes a transistor 01 and a pixel electrode 02. Wherein, one row of sub-pixels SPX corresponds to one row gate line, and one column of sub-pixels SPX corresponds to one column data line. The gate electrode of the transistor 01 is electrically connected to the corresponding gate line, the source electrode of the transistor 01 is electrically connected to the corresponding data line, and the drain electrode of the transistor 01 is electrically connected to the corresponding pixel electrode 02. It should be noted that the pixel array structure of the present disclosure can also be a double gate structure, that is, two gate lines are arranged between two adjacent rows of pixels. This arrangement can reduce half of the data lines, that is, data lines between two adjacent columns of pixels. Data lines may be not arranged between two adjacent columns of pixels, and the specific arrangement structure of pixels, data lines, and scan lines are not limited.

It should be noted that the display panel in the embodiment of the present disclosure may be a liquid crystal display panel. Exemplarily, a liquid crystal display panel generally includes an upper substrate and a lower substrate that are arranged oppositely to form a cell, and liquid crystal molecules encapsulated between the upper substrate and the lower substrate. When displaying an image, since there is a voltage difference between the data voltage on the pixel electrode of each sub-pixel SPX and the common electrode voltage on the common electrode, the voltage difference can form an electric field, so that the liquid crystal molecules are deflected under the action of the electric field. The liquid crystal molecules are deflected in different degrees by the electric field in different intensities, thereby resulting in different transmittances of the sub-pixels SPX, so that the sub-pixels SPX can achieve brightness of different gray scales, thereby realizing image display.

In the following description, the display panel in the embodiment of the present disclosure is a liquid crystal display panel, and the pixel unit includes the red sub-pixel, the green sub-pixel, and the blue sub-pixel, it should be understood that the color of the sub-pixels SPX included in the liquid crystal display panel is not limited to this.

For display products, such as wearable display products, they are in a sleep state when they are not in operation, and will be woken up when they are in operation. The wake-up refers to the process of turning on the switch of the whole machine (or lighting device) to light up the screen, because the wearable products often perform wake-up actions frequently, due to influences such as use temperature, use time, etc., jitter and horizontal stripes may occur for the wearable products, which affects the display quality.

In a wearable display product, the wake-up time of the display panel includes three phases set successively: the first phase (the first phase is an internal frequency phase), the conversion phase (the conversion phase is a frequency chasing phase, that is, converting from the internal frequency phase to the external frequency phase) and the second phase (the second phase is the external frequency phase). On the one hand, the reason why jitter and horizontal stripes occur for the display products is that in the wake-up timing, the potential of the pull-down node of the gate driving circuit is severely pulled down during the first frame time in the external frequency phase, which results in poor display; on the other hand, the stability of the pull-down node control module in the gate driving circuit decreases after the reliability test, and the potential of the pull-down node is easier to pull down in the wake-up mode.

Figure 3:
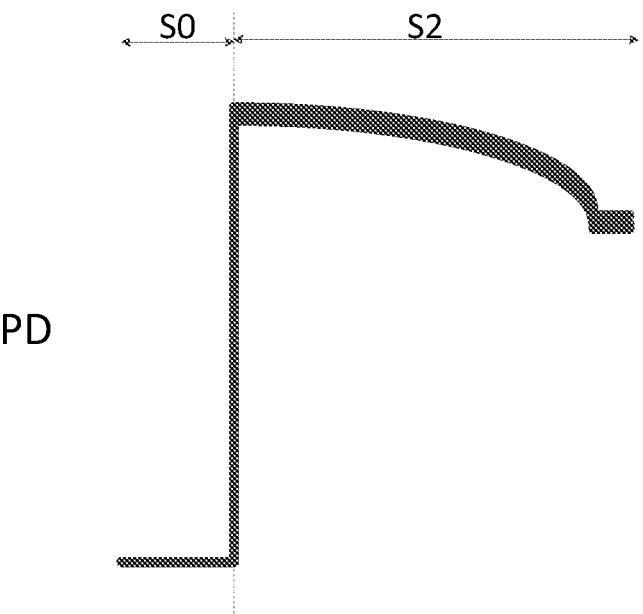
FIG. 3 is a diagram showing an abnormal electrical waveform in the related art.

More specifically, in wearable display products, the wake-up time of the display product is divided into three phases: the first phase is the internal frequency phase, in this phase, after the display device is powered on, the internal operation is performed by the driver IC, that is, the black frame insertion action. At this time, the driver IC does not send the data signal to the data line of the display panel, and the gate driving circuit works normally. The conversion phase is the frequency chasing phase that is the synchronization process between the driver IC and display screen. In the frequency chasing phase, the IC does not provide the initial signal and the clock signal to the gate driving circuit. At this time, the gate driving circuit does not provide the corresponding gate drive signal. However, referring to FIG. 3, from the abnormal electrical waveform, the potential of the pull-down node PD is abnormally reduced, for example, the potential of the pull-down node PD can be −10.6V at this time; the second phase S2 is the external frequency phase, that is, the phase where the IC drives the screen to display normally. During the conversion time of the internal and external frequency (that is, the conversion phase S0), the potential of the pull-up node PU in the last row of the display panel remains at 0V until the first frame of the external frequency starts. At this time, the potential of the pull-down node PD is −10.6V. After entering the external frequency phase, the potential of the pull-down node PD needs to be pulled up to a high potential, such as 10.0V or more. Since the voltage difference between −10.6V and 10.0V or more is too large, the pull-down node PD cannot be pulled up to the normal reference voltage, after the high temperature reliability test, such as the high temperature test at 60° C. or higher, the potential of the pull-down node PD becomes lower than the reference voltage, that is, the stability of the voltage of the pull-down node PD becomes worse after the high temperature reliability test, at this time, the gate driving circuit is in an unstable working state, and when the wake-up operation is performed, display defects such as horizontal stripes will occur.

After the reliability test, refer to Table 1 for the characteristic change of the transistor after the test at 60° C. for 20 days. After the reliability test, the turn-on current Ion3 of the third transistor M3 and the turn-on current Ion6 of the sixth transistor M6 will decrease, and the off-state current Ioff4 of M4 and the off-state current Ioff5 of the fifth transistor M5 will increase, the decrease of the on-state current Ion will lead to insufficient charging of the pull-down node PD, and the increase of the off-state current Ioff will lead to the increase of the leakage current of the pull-down node PD. As a result, the potential of the pull-down node PD cannot be maintained at the normal voltage reference level, so that the stability of the potential of the pull-down node PD is lowered.

TABLE 1

|  | Ion3 | Ion6 | Ioff4 | Ioff5 |
|---|---|---|---|---|
| Before high temperature reliability test | $22.74*10^{-9}$ A | $4.5*10^{-9}$ A | $1.11*10^{-9}$ A | $4.6*10^{-11}$ A |
| After high temperature reliability test | $20.29*10^{-9}$ A | $3.94*10^{-9}$ A | $3.87*10^{-9}$ A | $3.5*10^{-10}$ A |
| Data change | Decrease by 10.77% | Decrease by 12.44% | Increase by 71.31% | Increase by 660.86% |

Figure 4:
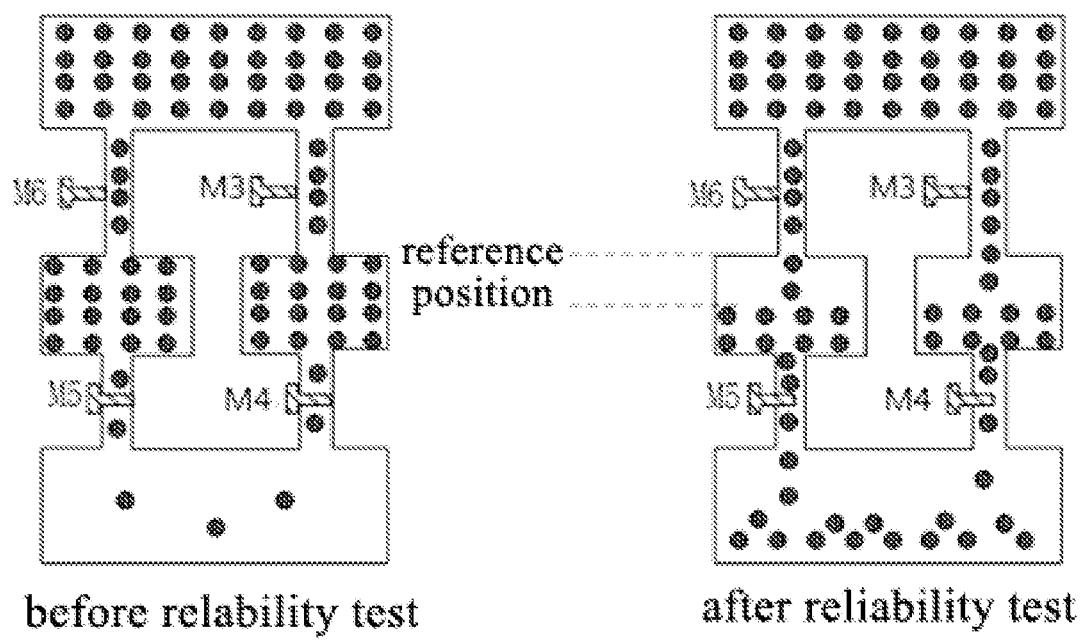
FIG. 4 is a schematic diagram of a potential of a pull-down node before and after the reliability test.

As shown in FIG. 4, after the reliability test, such as high temperature or high humidity tests, such as high temperature tests at 60° C. or 85° C., the turn-on current Ion3 of the third transistor M3 and the turn-on current Ion6 of the sixth transistor M6 decreases, resulting in insufficient charging of the pull-down node PD, the off-state current Ioff4 of the fourth transistor M4 and the off-state current Ioff5 of the fifth transistor M5 increase, resulting in an increase in leakage current, and the potential of PD cannot maintain the normal voltage level.

Figure 5:
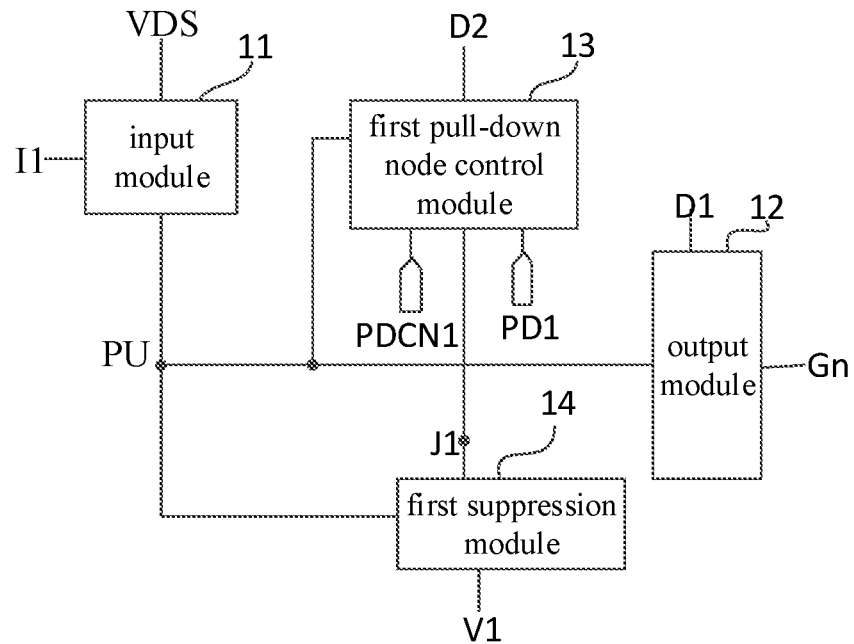
FIG. 5 is a structural diagram of a gate driving circuit according to at least one embodiment of the present disclosure.

As shown in FIG. 5, the gate driving circuit according to the embodiment of the present disclosure includes an input module 11, a pull-up node PU, an output module 12, a first pull-down node PD1, a first pull-down node control module 13 and a first suppression module 14;

The input module 11 is electrically connected to an input control terminal I1, a first input terminal VDS and the pull-up node PU respectively, and is configured to input a signal inputted by the first input terminal VDS into the pull-up node PU under the control of the first input control terminal I1;

The output module 12 is electrically connected to the pull-up node PU, the first signal terminal D1 and an output terminal Gn respectively, and is configured to output the signal inputted by the first signal terminal D1 through the output terminal Gn under the control of the potential of the pull-up node PU;

The first pull-down node control module 13 is electrically connected to a second signal terminal D2, a first pull-down control node PD_CN1, a first pull-down node PD1, a pull-up node PU and a first connection node J1, respectively, and is configured to control the potential of the first pull-down control node PD_CN1 under the control of the second signal terminal D2 and the potential of the pull-up node PU, and is configured to control to connect the first connection node J1 and the first pull-down node PD1 under the control of the potential of the pull-up node PU, and is configured to input the signal provided by the second signal terminal D2 to the first pull-down node PD1 under the control of the potential of the first pull-down node PD1;

The first suppression module 14 is respectively electrically connected to the pull-up node PU, the first connection node Jl1 and the first level signal terminal V1, and is configured to input the signal provided by the first level signal terminal V1 to the first connection node J1 under the control of the potential of the pull-up node PU.

In at least one embodiment of the present disclosure, the first signal terminal D1 may be a clock signal terminal K1, the second signal terminal D2 may be a first control voltage terminal GCH, and the first level signal terminal V1 may be a low voltage terminal VGL, but not limited thereto.

During operation of the display panel according to the embodiment of the present disclosure, by adding the first suppression module 14, the leakage current between the first level signal terminal V1 and the first pull-down node PD1 is reduced, thereby enhancing the stability of the potential of the pull-down node PD1, such that the potential of the first pull-down node PD1 will not be greatly pulled down in the conversion phase, and then after entering the second phase, the potential of the first pull-down node PD1 can be maintained at a high potential to avoid wake-up jitter and horizontal stripes.

The display panels described in the embodiments of the present disclosure can be applied to wearable products. In the related art, since wearing products often frequently perform wake-up actions, due to the influence of other factors (temperature, time of use, etc.), during the wake-up process, at the beginning of the second phase, the potential of the first pull-down node PD1 is severely pulled down, which is easier to occur jitter and horizontal stripe. The reason of the horizontal stripes is that after a long-term high-temperature reliability test, the characteristics of the transistors included in the first pull-down node control module 13 drift and the stability decreases. The turn-on current Ino of the transistor that raises the potential of the first pull-down node PD1 decreases, and the pull-up capability of the second signal terminal D2 to the first pull-down node PD1 is insufficient; the leakage current Ioff of the transistor included in the first pull-down node control module 13 and pulling down the potential of the first pull-down node PD1 increases, and the pull-down capability of the first level signal terminal V1 to the first pull-down node PD1 is enhanced. Based on this, the gate driving circuit described in the embodiment of the present disclosure adds a first suppression module 14 to reduce the leakage current between the first pull-down node PD1 and the first level signal terminal V1, thereby preventing the potential of the first pull-down node PD1 from greatly pulling down during the conversion phase. After the conversion phase ends, when the second phase starts, the potential of the first pull-down node PD1 can be raised, so as to prevent the horizontal stripe from occurring. This solution has little change to the gate driving circuit and does not involve the change on timing, and is more suitable for wearable products with narrow bezel requirements.

The working time of the display panel may include a wake-up phase, wherein the wake-up phase includes a first phase, a conversion phase and a second phase, the first phase is a phase where no data signal is written into the display panel, and the second phase is a phase where the data signal is written into the display panel.

According to an embodiment, when the display panel according to the embodiment of the present disclosure is in operation, at least part of the time included in the conversion phase, under the control of a trigger signal, an active level is inputted to the second signal terminal D2, so that the first pull-down node control module 13 controls to pull up the potential of the first pull-down node PD1, thereby ensuring that the potential of the first pull-down node PD1 can be maintained when the second phase starts.

According to another implementation manner, when the display panel according to the embodiment of the present disclosure is in operation, in the conversion phase, the signal provided by the second signal terminal D2 may not be set, and the potential of the first pull-down node PD1 is maintained during the conversion phase.

Figure 6:
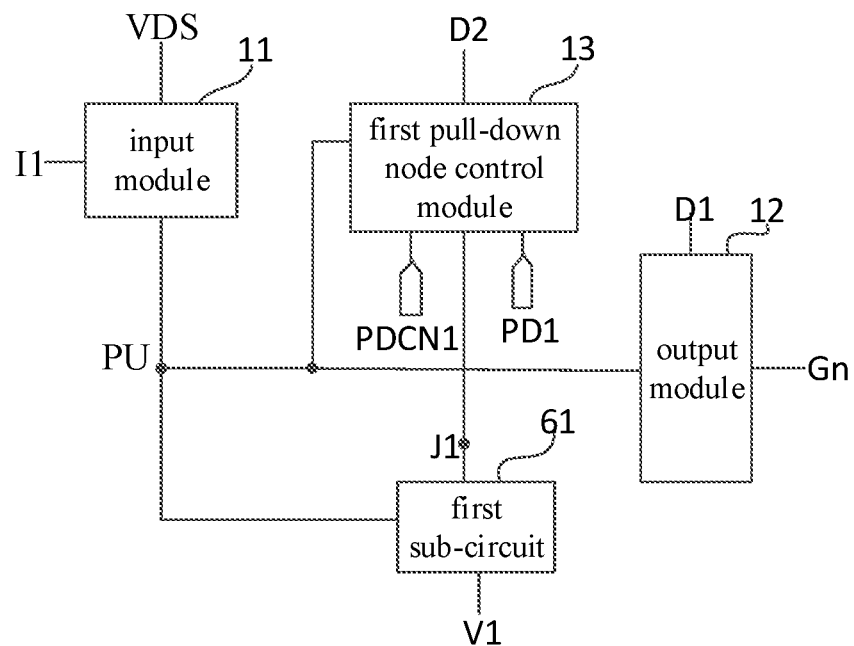
FIG. 6 is a structural diagram of a gate driving circuit according to at least one embodiment of the present disclosure.

As shown in FIG. 6, based on the embodiment of the gate driving circuit shown in FIG. 5, the first suppression module may include a first sub-circuit 61;

The first sub-circuit 61 is electrically connected to the pull-up node PU, the first connection node J1 and the first level signal terminal V1 respectively, and is configured to input the signal inputted by the first level signal terminal V1 into the first connection node J1 under the control of the potential of the pull-up node PU.

In the gate driving circuit shown in FIG. 6 of the present disclosure, a first sub-circuit 61 is provided between the first connection node J1 and the first level signal terminal V1 to reduce the leakage current between the first pull-down node PD1 and the first level signal terminal V1.

Figure 7:
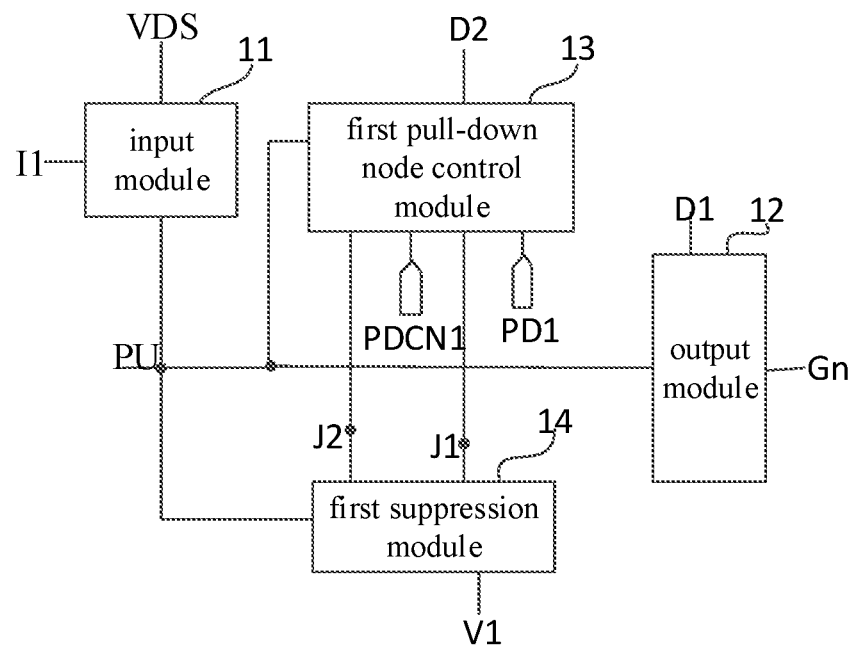
FIG. 7 is a structural diagram of a gate driving circuit according to at least one embodiment of the present disclosure.

As shown in FIG. 7, in the gate driving circuit according to at least one embodiment of the present disclosure, on the basis of the embodiment of the gate driving circuit shown in FIG. 5, the first pull-down node control module 13 is electrically connected to the second connection node J2, and is configured to input the signal provided by the second signal terminal D2 to the first pull-down control node PD_CN1 under the control of the second signal terminal D2, and control to connect the first pull-down control node PD_CN1 and the second connection node J2 under the control of the potential of the pull-up node PU;

The first suppression module 14 is also electrically connected to the second connection node J2, is configured to input the signal provided by the first level signal terminal V1 to the second connection node J2 under the control of the potential of the pull-up node PU.

In the gate driving circuit according to at least one embodiment of the present disclosure, a transistor included in the first pull-down node control module 13 is arranged between the first pull-down control node PD_CN1 and the second connection node J2, the first suppression module 14 is also arranged at the second connection node J2 and the first level signal terminal V1 to reduce the leakage current between the first pull-down control node PD_CN1 and the first level signal terminal V1, which is beneficial to maintain the potential of the first pull-down control node PD_CN1 and enhance the stability of the potential of the first pull-down node PD1.

In at least one embodiment of the present disclosure, the first suppression module may further include a second sub-circuit, the second sub-circuit is respectively connected to the pull-up node, the second connection node and the first level signal terminal, and is configured to input the signal inputted by the first level signal terminal to the second connection node under the control of the potential of the pull-up node.

In a specific implementation, the first suppression module may further include a second sub-circuit, the second sub-circuit is arranged between the first level signal terminal and the second connection node, so as to reduce the leakage current between the first level signal terminal and the first pull-down control node.

Figure 8:
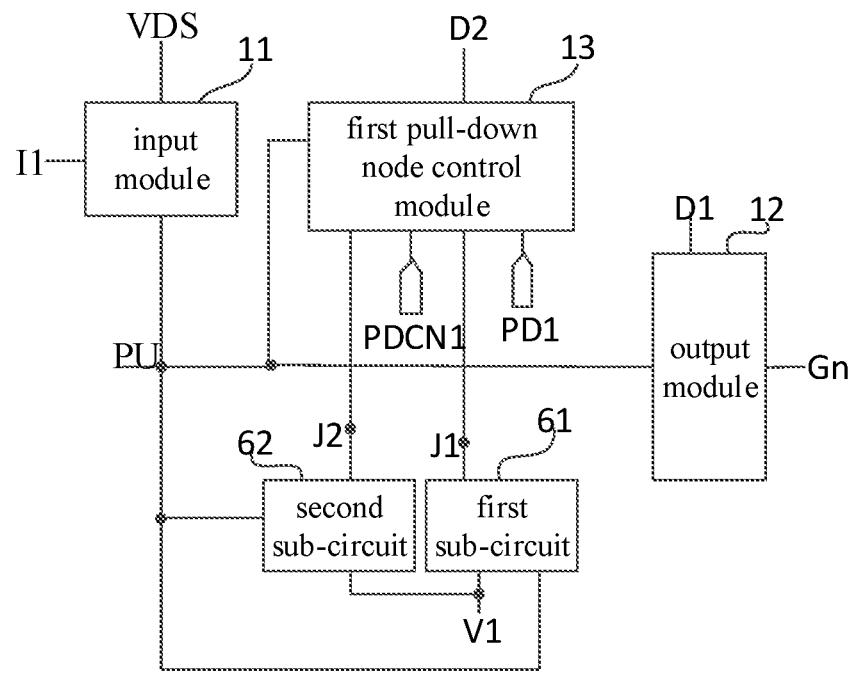
FIG. 8 is a structural diagram of a gate driving circuit according to at least one embodiment of the present disclosure.

As shown in FIG. 8, based on at least one embodiment of the gate driving circuit shown in FIG. 7, the first suppression module may include a first sub-circuit 61 and a second sub-circuit 62;

The first sub-circuit 61 is electrically connected to the pull-up node PU, the first connection node J1 and the first level signal terminal V1 respectively, and is configured to input the signal inputted by the first level signal terminal V1 to the first connection node J1 under the control of the potential of the pull-up node PU;

The second sub-circuit 62 is electrically connected to the pull-up node PU, the second connection node J2 and the first level signal terminal V1 respectively, and is configured to input the signal inputted by the first level signal terminal V1 to the second connection node J2 under the control of the potential of the pull-up node PU.

The gate driving circuit described in at least one embodiment of the present disclosure may further include a first noise reduction module;

The first noise reduction module is electrically connected to the pull-up node, the output terminal, the first pull-down node and the first level signal terminal, respectively, and is configured to input the signal provided by the first level signal terminal to the pull-up node and/or the output terminal under the control of the potential of the first pull-down node.

The gate driving circuit according to at least one embodiment of the present disclosure may perform noise reduction on the pull-up node and/or the output terminal through the first noise reduction module.

Figure 9:
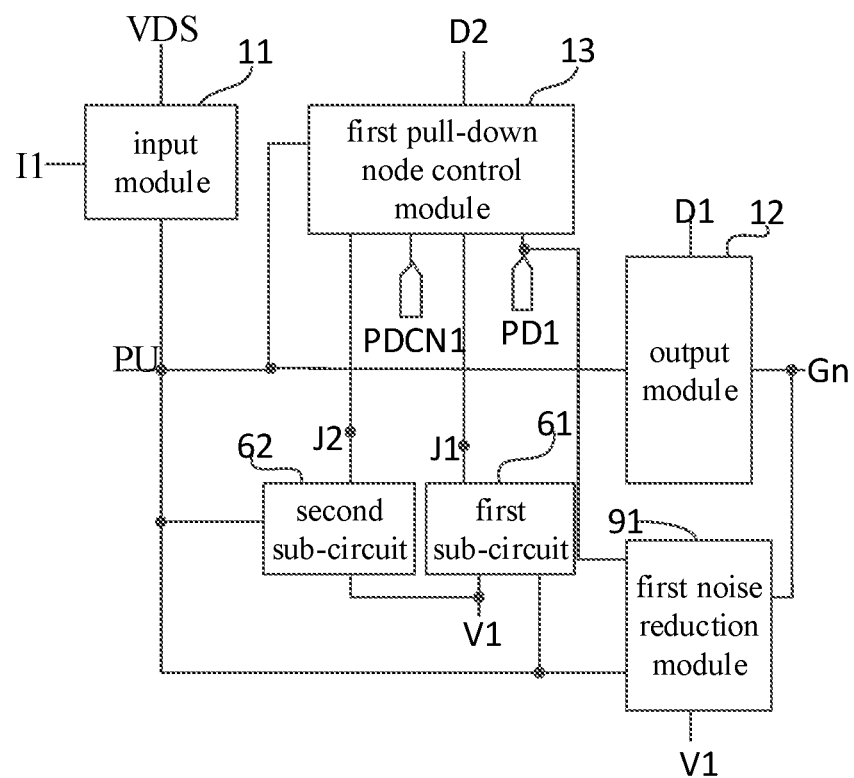
FIG. 9 is a structural diagram of a gate driving circuit according to at least one embodiment of the present disclosure.

As shown in FIG. 9, on the basis of at least one embodiment of the gate driving circuit shown in FIG. 8, the gate driving circuit according to at least one embodiment of the present disclosure may further include a first noise reduction module 91;

The first noise reduction module 91 is respectively electrically connected to the pull-up node PU, the output terminal Gn, the first pull-down node PD1 and the first level signal terminal V1, and is configured to input the signal provided by the first level signal terminal V1 to the pull-up node PU and the output terminal Gn under the control of the potential of the first pull-down node PD1.

In at least one embodiment of the gate driving circuit shown in FIG. 9 of the present disclosure, when the potential of the first pull-down node PD1 is an active voltage, the first noise reduction module 81 inputs the signal provided by the first level signal terminal V1 to the pull-up node PU and the output terminal Gn, so as to perform noise reduction on the pull-up node PU and the output terminal Gn.

Figure 10:
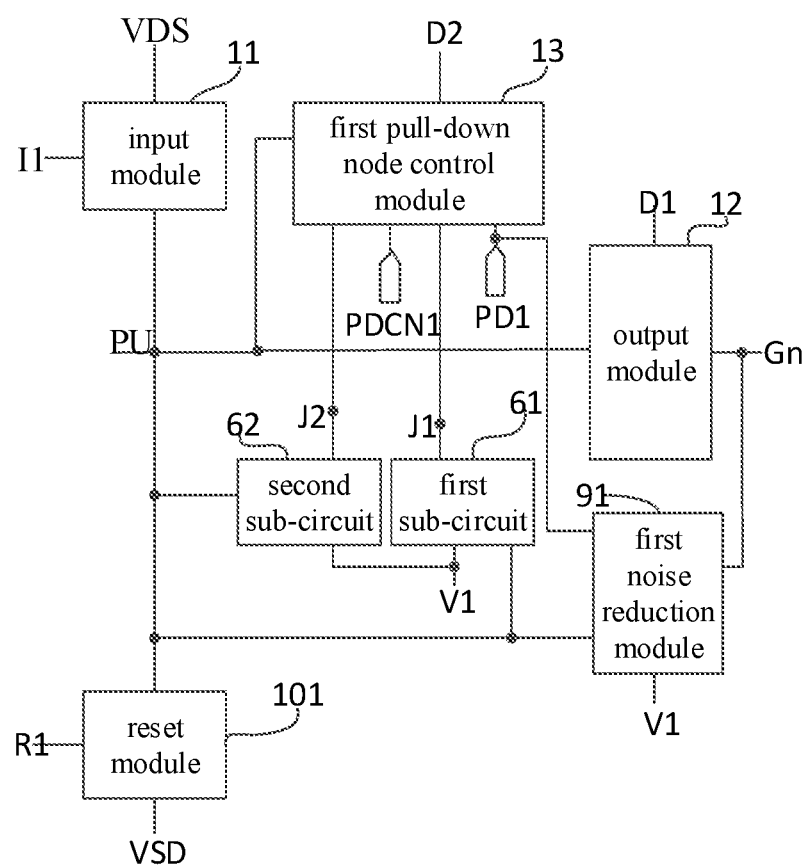
FIG. 10 is a structural diagram of a gate driving circuit according to at least one embodiment of the present disclosure.

As shown in FIG. 10, on the basis of at least one embodiment of the gate driving circuit shown in FIG. 9, the gate driving circuit according to at least one embodiment of the present disclosure may further include a reset module 101;

The reset module 101 is electrically connected to the pull-up node PU, the second input terminal VSD and the reset signal terminal R1 respectively, and is configured to input the signal inputted by the second input terminal VSD to the pull-up node PU under the control of the reset signal terminal R1.

In a specific implementation, when the signal inputted by the second input terminal VSD is a low voltage signal, the reset module 101 inputs the low voltage signal to the pull-up node PU under the control of the reset signal terminal R1, to reset the potential of the pull-up node.

Figure 11:
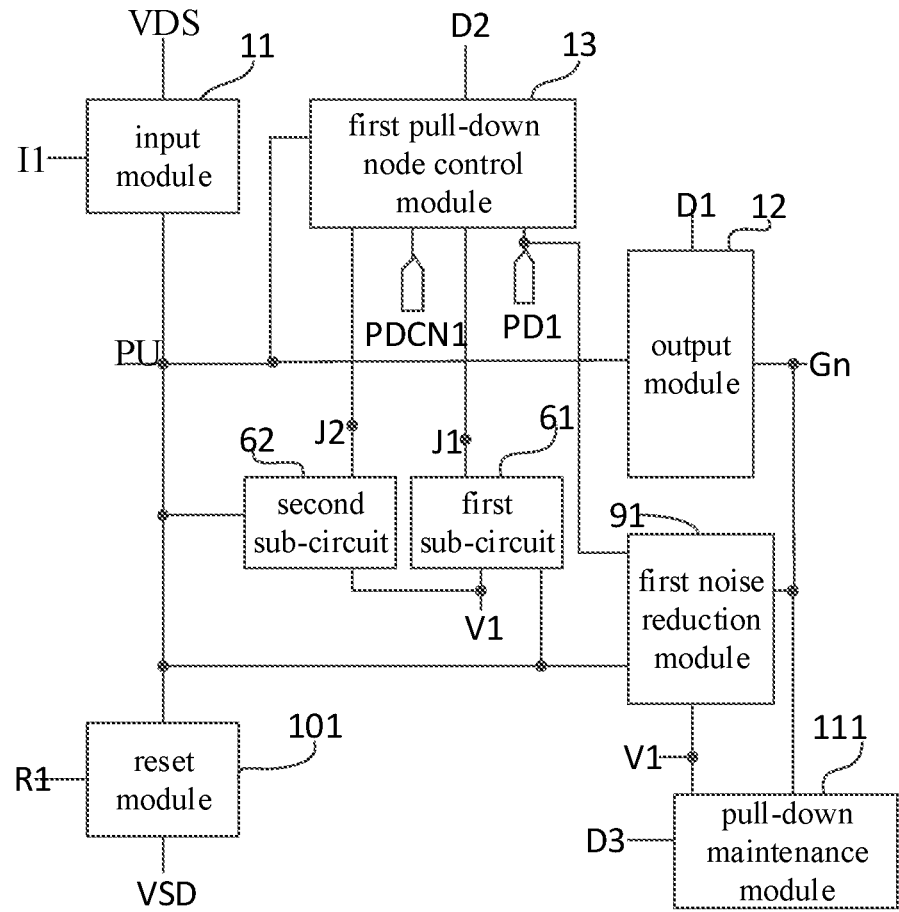
FIG. 11 is a structural diagram of a gate driving circuit according to at least one embodiment of the present disclosure.

As shown in FIG. 11, on the basis of at least one embodiment of the gate driving circuit shown in FIG. 10, the gate driving circuit according to at least one embodiment of the present disclosure may further include a pull-down maintenance module 111;

The pull-down maintenance module 111 is electrically connected to the output terminal Gn, the third signal terminal D3 and the first level signal terminal V1 respectively, and is configured to input the signal inputted by the first level signal terminal V1 to the output terminal Gn under the control of the third signal terminal D3, to pull down the potential of the signal outputted by the output terminal Gn.

In at least one embodiment of the present disclosure, the third signal terminal D3 may be the second control voltage terminal GCL, but is not limited thereto.

Figure 12:
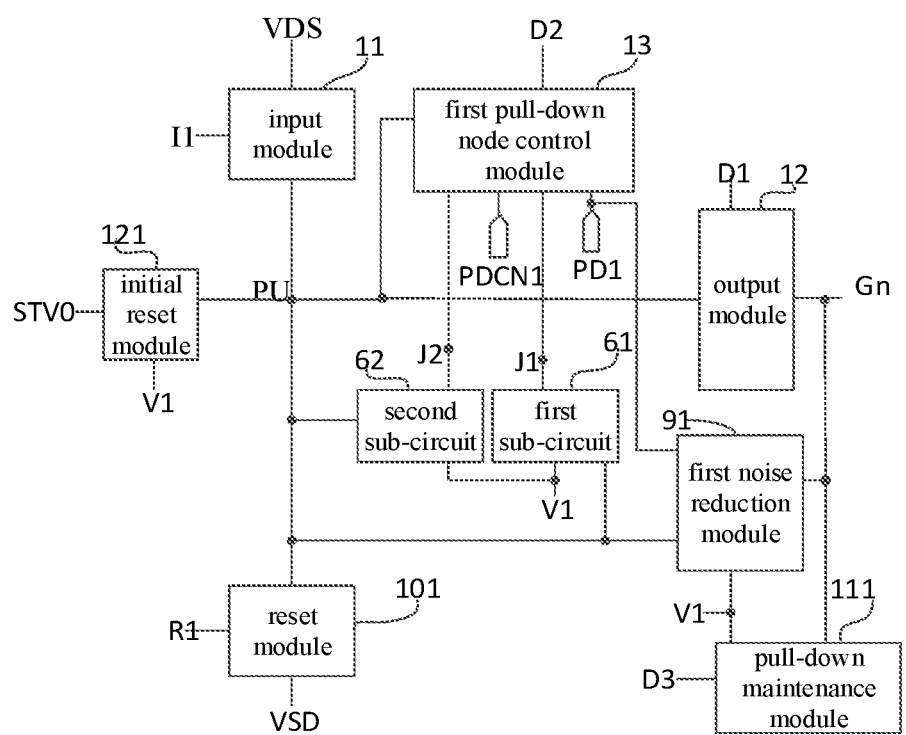
FIG. 12 is a structural diagram of a gate driving circuit according to at least one embodiment of the present disclosure.

As shown in FIG. 12, on the basis of at least one embodiment of the gate driving circuit shown in FIG. 11, the gate driving circuit according to at least one embodiment of the present disclosure may further include an initial reset module 121;

The initial reset module 121 is electrically connected to the pull-up node PU, the initial signal terminal STV0, and the first level signal terminal V1, respectively, and is configured to input the signal inputted by the first level signal terminal V1 to the pull-up node PU under the control of the initial signal terminal STV0, to reset the potential of the pull-up node PU.

Optionally, the input module includes a first transistor, a gate electrode of the first transistor is electrically connected to the input control terminal, a first electrode of the first transistor is electrically connected to the first input terminal, and a second electrode of the first transistor is electrically connected to the pull-up node.

Optionally, the output module includes a second transistor and a first capacitor;

A gate electrode of the second transistor is electrically connected to the pull-up node, a first electrode of the second transistor is electrically connected to the first signal terminal, and a second electrode of the second transistor is electrically connected to the output terminal;

A first electrode plate of the first capacitor is electrically connected to the pull-up node, and a second electrode plate of the first capacitor is electrically connected to the output terminal.

Optionally, the first pull-down node control module includes a third transistor, a fourth transistor, a fifth transistor and a sixth transistor;

A gate electrode of the sixth transistor and a first electrode of the sixth transistor are both electrically connected to the second signal terminal, and a second electrode of the sixth transistor is electrically connected to a gate electrode of the third transistor; the gate electrode of the third transistor is electrically connected to the first pull-down control node;

A first electrode of the third transistor is electrically connected to the second signal terminal, and a second electrode of the third transistor is electrically connected to the first pull-down node;

A gate electrode of the fourth transistor is electrically connected to the pull-up node, a first electrode of the fourth transistor is electrically connected to the first pull-down node, and a second electrode of the fourth transistor is electrically connected to the first pull-down node;

A gate electrode of the fifth transistor and the gate electrode of the fourth transistor are both electrically connected to the pull-up node, and a first electrode of the fifth transistor and the second electrode of the sixth transistor are both electrically connected to the gate electrode of the third transistor, and a second electrode of the fifth transistor is electrically connected to the second connection node.

Optionally, the first noise reduction module includes a seventh transistor and an eighth transistor;

A gate electrode of the seventh transistor is electrically connected to the first pull-down node, a first electrode of the seventh transistor is electrically connected to the pull-up node, and a second electrode of the seventh transistor is electrically connected to the first level signal terminal;

A gate electrode of the eighth transistor is electrically connected to the first pull-down node, a first electrode of the eighth transistor is electrically connected to the output terminal, and a second electrode of the eighth transistor is electrically connected to the first level signal terminal.

Optionally, the first sub-circuit includes a ninth transistor, a gate electrode of the ninth transistor is electrically connected to the pull-up node, and a first electrode of the ninth transistor is connected to a second electrode of the fourth transistor, and a second electrode of the ninth transistor is electrically connected to the first level signal terminal.

Optionally, the second sub-circuit includes a tenth transistor, a gate electrode of the tenth transistor is electrically connected to the pull-up node and the gate electrode of the ninth transistor, and a first electrode of the tenth transistor is electrically connected to the second electrode of the fifth transistor, and a second electrode of the tenth transistor is electrically connected to the first level signal terminal.

Optionally, the reset module includes an eleventh transistor, a gate electrode of the eleventh transistor is electrically connected to the reset signal terminal, and a first electrode of the eleventh transistor is electrically connected to the pull-up node, a second electrode of the eleventh transistor is electrically connected to the second input terminal.

Optionally, the pull-down maintenance module includes a twelfth transistor, a gate electrode of the twelfth transistor is electrically connected to the third signal terminal, and a first electrode of the twelfth transistor is electrically connected to the output terminal, and a second electrode of the twelfth transistor is electrically connected to the first level signal terminal.

Optionally, the initial reset module includes a thirteenth transistor, a gate electrode of the thirteenth transistor is electrically connected to the initial signal terminal, and a first electrode of the thirteenth transistor is electrically connected to the pull-up node, and the second electrode of the thirteenth transistor is electrically connected to the first level signal terminal.

Figure 13:
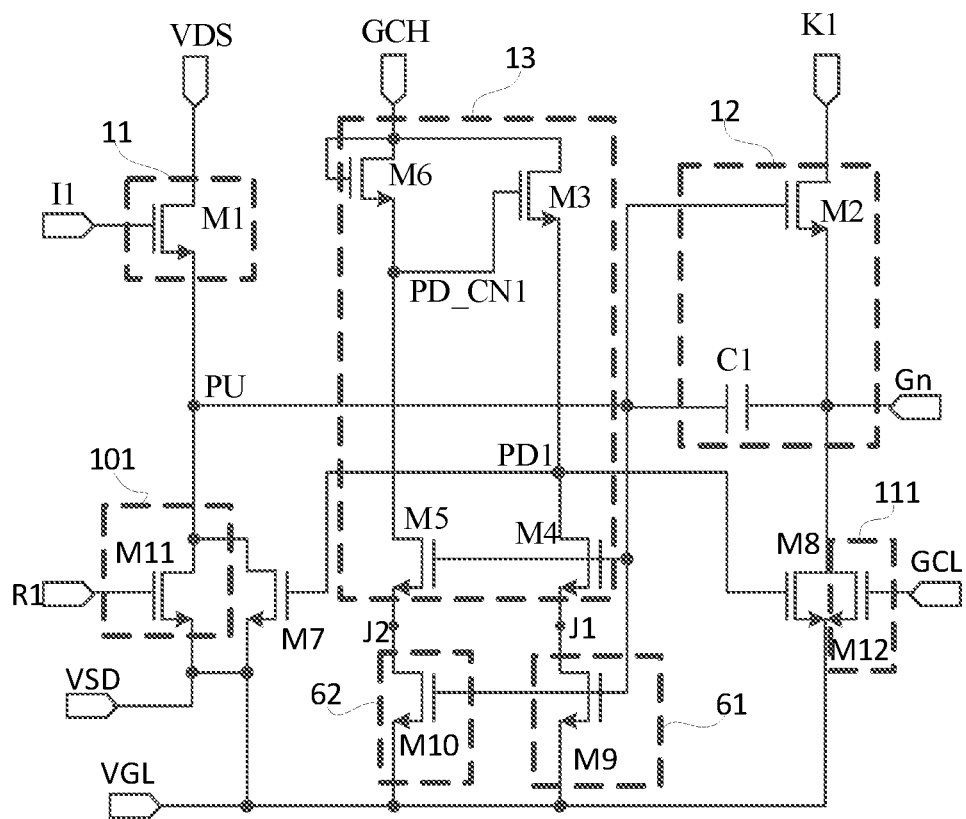
FIG. 13 is a circuit diagram of a gate driving circuit according to at least one embodiment of the present disclosure.

As shown in FIG. 13, on the basis of at least one embodiment of the gate driving circuit shown in FIG. 11, the input module 11 includes a first transistor M1;

The gate electrode of the first transistor M1 is electrically connected to the input control terminal I1, the drain electrode of the first transistor M1 is electrically connected to the first input terminal VDS, and the source electrode of the first transistor M1 is electrically connected to the pull-up node PU;

The output module 12 includes a second transistor M2 and a first capacitor C1;

The gate electrode of the second transistor M2 is electrically connected to the pull-up node PU, the drain electrode of the second transistor M2 is electrically connected to the clock signal terminal K1, and the source electrode of the second transistor M2 is electrically connected to the output terminal Gn;

The first electrode plate of the first capacitor C1 is electrically connected to the pull-up node PU, and the second electrode plate of the first capacitor C1 is electrically connected to the output terminal Gn;

The first pull-down node control module 13 includes a third transistor M3, a fourth transistor M4, a fifth transistor M5 and a sixth transistor M6;

The gate electrode of the sixth transistor M6 and the drain electrode of the sixth transistor M6 are both electrically connected to the first control voltage terminal GCH, and the source electrode of the sixth transistor M6 is electrically connected to the gate electrode of the third transistor M3; the gate electrode of the third transistor M3 is electrically connected to the first pull-down control node PD_CN1;

The drain electrode of the third transistor M3 is electrically connected to the first control voltage terminal GCH, and the source electrode of the third transistor M3 is electrically connected to the first pull-down node PD1;

The gate electrode of the fourth transistor M4 is electrically connected to the pull-up node PU, the drain electrode of the fourth transistor M4 is electrically connected to the first pull-down node PD1, and the source electrode of the fourth transistor M4 is electrically connected to the first connection node J1;

The gate electrode of the fifth transistor M5 and the gate electrode of the fourth transistor M4 are both electrically connected to the pull-up node PU, and the drain electrode of the fifth transistor M5 and the source electrode of the sixth transistor M6 are both electrically connected to the gate electrode of the third transistor M3, and the source electrode of the fifth transistor M5 is electrically connected to the second connection node J2;

The first noise reduction module includes a seventh transistor M7 and an eighth transistor M8;

The gate electrode of the seventh transistor M7 is electrically connected to the first pull-down node PD1, the drain electrode of the seventh transistor M7 is electrically connected to the pull-up node PU, and the source electrode of the seventh transistor M7 is electrically connected to the low voltage terminal VGL;

The gate electrode of the eighth transistor M8 is electrically connected to the first pull-down node PD1, the drain electrode of the eighth transistor M8 is electrically connected to the output terminal Gn, and the source electrode of the eighth transistor M8 is electrically connected to the low voltage terminal VGL;

The first sub-circuit 61 includes a ninth transistor M9;

The gate electrode of the ninth transistor M9 is electrically connected to the pull-up node PU, the drain electrode of the ninth transistor M9 is electrically connected to the source electrode of the fourth transistor M4, and the source electrode of the ninth transistor M9 is electrically connected to the low voltage terminal VGL;

The second sub-circuit 62 includes a tenth transistor M10;

The gate electrode of the tenth transistor M10 is electrically connected to the pull-up node PU and the gate electrode of the ninth transistor M9, and the drain electrode of the tenth transistor M10 is electrically connected to the source electrode of the fifth transistor M5, the source electrode of the tenth transistor M10 is electrically connected to the low voltage terminal VGL;

The reset module 101 includes an eleventh transistor M11;

The gate electrode of the eleventh transistor M11 is electrically connected to the reset signal terminal R1, the drain electrode of the eleventh transistor M11 is electrically connected to the pull-up node PU, and the source electrode of the eleventh transistor M11 electrically connected to the second input terminal VSD;

The pull-down maintenance module 111 includes a twelfth transistor M12;

The gate electrode of the twelfth transistor M12 is electrically connected to the second control voltage terminal GCL, the drain electrode of the twelfth transistor M12 is electrically connected to the output terminal Gn, and the source electrode of the twelfth transistor M12 is electrically connected to the low voltage terminal VGL; optionally, the GCL signal and the GCH signal are signals with opposite phases, for example, when the potential of the GCH signal is a high potential, the potential of the GCL signal is a low potential; when the potential of the GCH signal is a low potential, the potential of the GCL signal is a high potential.

In at least one embodiment of the gate driving circuit shown in FIG. 13, all transistors are n-type transistors, but not limited thereto.

In at least one embodiment of the gate driving circuit shown in FIG. 13 of the present disclosure, the first signal terminal is a clock signal terminal K1, the second signal terminal is a first control voltage terminal GCH, and the third signal terminal is the second control voltage terminal GCL, and the first level signal terminal may be the low voltage terminal VGL, but not limited thereto.

In at least one embodiment of the present disclosure, the GCL signal is a voltage signal provided by the GCL, and the GCH signal is a voltage signal provided by the GCH.

Compared with the related art, in at least one embodiment of the gate driving circuit shown in FIG. 13 of the present disclosure, only two transistors are added, which does not affect the design requirements of a wearable product with a narrow frame.

In at least one embodiment of the present disclosure, the first control voltage provided by the first control voltage terminal GCH and the second control voltage provided by the second control voltage terminal VGL may have opposite phases; within one frame of time, the first control voltage provided by the first control voltage terminal GCH may be a high voltage;

During at least part of a blank time period between two adjacent frame of times, the second control voltage terminal can output a high voltage signal to control M12 to be turned on, and maintain the potential of the signal provided by the output terminal Gn at low voltage, but not limited to this.

In at least one embodiment of the gate driving circuit shown in FIG. 13, a ninth transistor M9 is provided between the first connection node J1 and the low voltage terminal VGL, and a tenth transistor M10 is provided between the second connection node J2 and the low voltage terminal VGL; that is, a fourth transistor M4 and a ninth transistor M9 connected in series are provided between the first pull-down node PD1 and the low voltage terminal VGL, and a fifth transistor M5 and a tenth transistor M10 connected in series are provided between the first pull-down control node PD_CN1 and the low voltage terminal VGL, to reduce the leakage current between the first node PD1 and the low voltage terminal VGL, and reduce the leakage current between the first pull-down control node PD_CN1 and the low voltage terminal VGL. Therefore, the potential of the first pull-down node PD1 will not be greatly pulled down during the conversion phase, so that at the beginning of the second phase, the potential of the first pull-down node PD1 can be raised to prevent horizontal strips.

Figure 14:
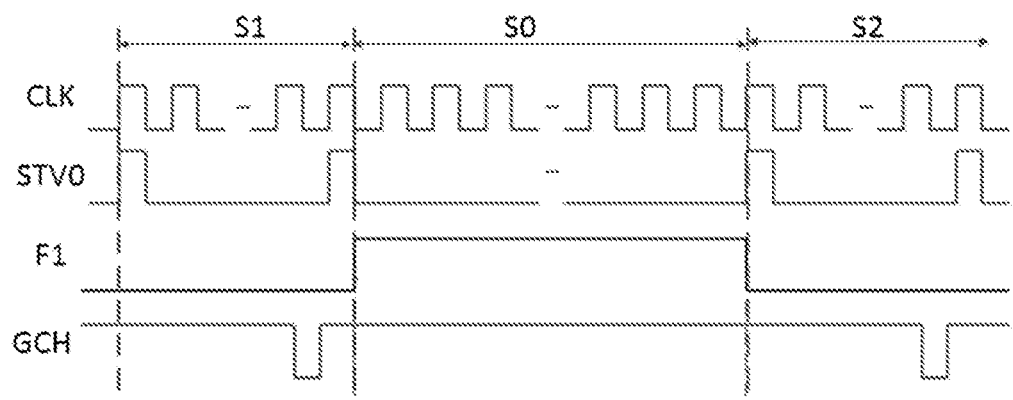
FIG. 14 is an timing diagram of the gate driving circuit shown in FIG. 13 according to at least one embodiment of the present disclosure.

As shown in FIG. 14, when at least one embodiment of the gate driving circuit shown in FIG. 13 of the present disclosure is in operation, the wake-up phase of the display panel (the display panel includes the gate driving circuit) includes the first phase S1, the conversion phase S0 and the second phase S2, the first phase S1 is a phase where no data signal is written into the display panel, the second phase S2 is a phase where the data signal is written into the display panel;

In the first phase S1 and the second phase S2, the potential of the trigger signal F1 is a low voltage, and the timing sequence of the first control voltage provided by the GCH is outputted according to the normal timing sequence. Optionally, the trigger signal F1 is not defined in the first phase and the second phase, which can be a low level or a high level;

In the conversion phase S0, the potential of the trigger signal F1 is a high voltage, and the potential of the first control voltage provided by the GCH is pulled up to a high voltage, so that M3 and M6 are turned on, so that the potential of the first pull-down node PD1 is a high voltage, at this time, in the first frame of time in the second phase S2, the potential of the first pull-down node PD1 is not pulled down, and there is no defect in the 20-day verification. That is, the GCH signal can be controlled in the conversion phase, the GCH signal is raised to a high level in the conversion phase, so that the potential of the first pull-down node PD1 is a high voltage. FIG. 14 shows that the trigger signal switches from a low level to a high level when switching from the first phase to the conversion phase, the GCH signal is raised to a high level. If the potential of the GCH signal is high in the previous phase, the potential of the GCH signal continues to maintain at a high potential. If the potential of the GCH signal is low in the previous phase, then the low potential is converted to a high potential. In addition, when the trigger signal is switched from a high level to a low level when the first phase is switched to the conversion phase, and the trigger GCH signal is raised to a high level. If the potential of the GCH signal in the previous phase is a high potential, then the potential of the GCH signal continues to maintain at a high potential. If the previous potential of the GCH signal is a low potential in the previous phase, the low potential is converted to a high potential. The trigger signal plays a role of reminding the GCH signal. Therefore, the trigger signal undergoes signal switching, whether switching from a high potential to a low potential or switching from a low potential to a high potential, which is within the scope of protection of the present disclosure. Optionally, the potential of the GCH signal is kept high during the entire conversion phase, or during at least part of the conversion phase. The potential of the GCH signal remains high for more than half of the conversion phase to improve the horizon strips.

It should be noted that the driving method in the present disclosure can be used alone, that is, the first suppression module is not set in the circuit, and the GCH signal is only controlled by adding a trigger signal during the driving, so as to improve the problem of horizontal stripes. At this time, only timing is adjusted and the circuit structure is not adjusted, the method is simpler and the cost is lower, and no additional transistors are added in the circuit structure, and a narrow frame can be realized.

It should be noted that, in this case, the problem of horizontal stripes can be improved only by adding the first suppressing module to the circuit structure, without cooperating with the driving method.

It should be noted that, in this case, the driving method and the circuit structure added with the first suppression module are jointly used to improve the horizontal stripes, which is not limited herein.

In at least one embodiment of the present disclosure, the GCH signal is a voltage signal provided by the GCH.

In FIG. 14, STV0 is the initial voltage terminal, and the waveform corresponding to STV0 is the waveform of the initial voltage.

When at least one embodiment of the gate driving circuit shown in FIG. 13 of the present disclosure is in operation, the potential of the first control voltage may be forcibly pulled up in the conversion phase, or, the timing of the first control voltage provided by the GCH may be the normal timing in the conversion phase.

Figure 15A:
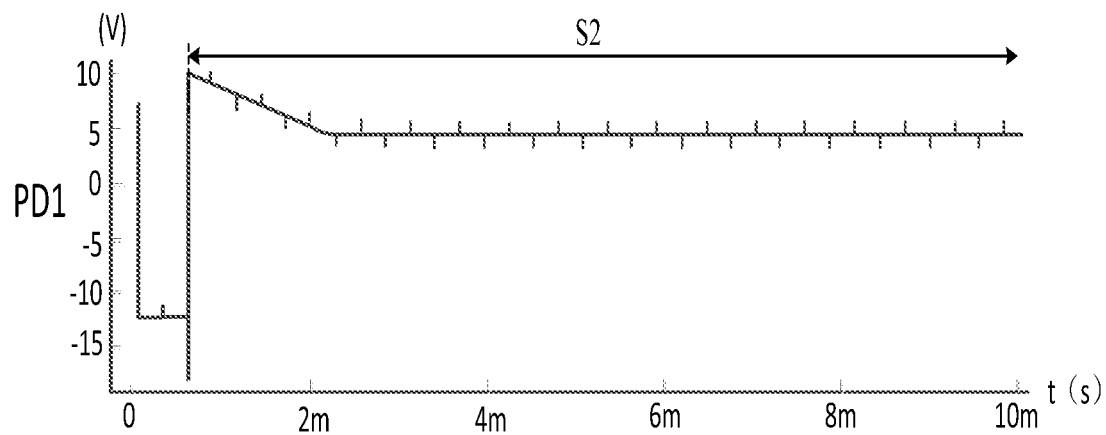
FIG. 15A is a simulation waveform diagram of the potential of the first pull-down node PD1 before the ninth transistor M9 and the tenth transistor M10 are added.
Figure 15B:
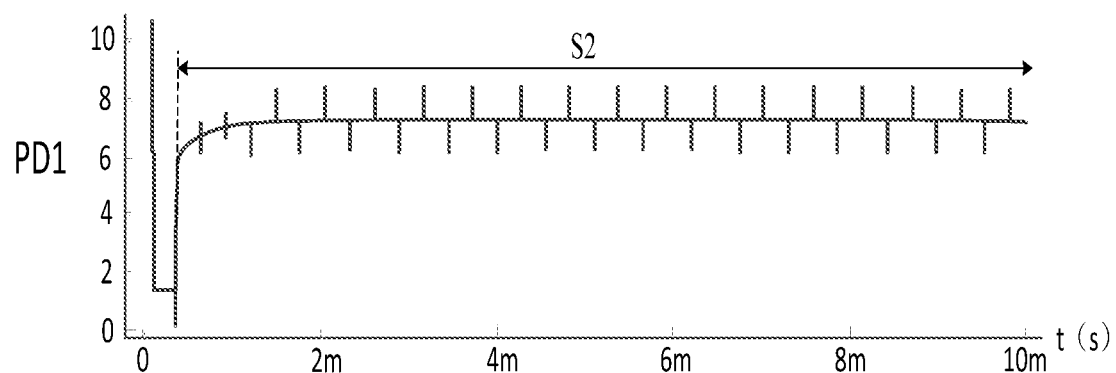
FIG. 15B is a simulation waveform diagram of the potential of the first pull-down node PD1 after the ninth transistor M9 and the tenth transistor M10 are added.

FIG. 15A is a simulation waveform diagram of the potential of the first pull-down node PD1 before M9 and M10 are added, and FIG. 15B is a simulation waveform diagram of the potential of the first pull-down node PD1 after M9 and M10 are added.

In FIGS. 15A and 15B, S2 is the second phase S2.

As shown in FIG. 15A, at the beginning of the second phase S2, the potential of the first pull-down node PD1 is pulled down. As shown in FIG. 15B, at the beginning of the second phase S2, the potential of the first pull-down node PD1 is not pulled down.

In FIGS. 15A and 15B, the horizontal axis is time t, and the unit is second(s).

In at least one embodiment of the gate driving circuit shown in FIG. 13 of the present disclosure, when the first input terminal VDS provides a high voltage signal and the second input terminal VSD provides a low voltage signal, the shift register including the gate driving circuit can perform forward scanning;

When the first input terminal VDS provides a low voltage signal and the second input terminal VSD provides a high voltage signal, the shift register including the gate driving circuit can perform reverse scanning;

The gate driving circuit shown in FIG. 13 of the present disclosure is capable of performing bidirectional scanning.

Figure 16:
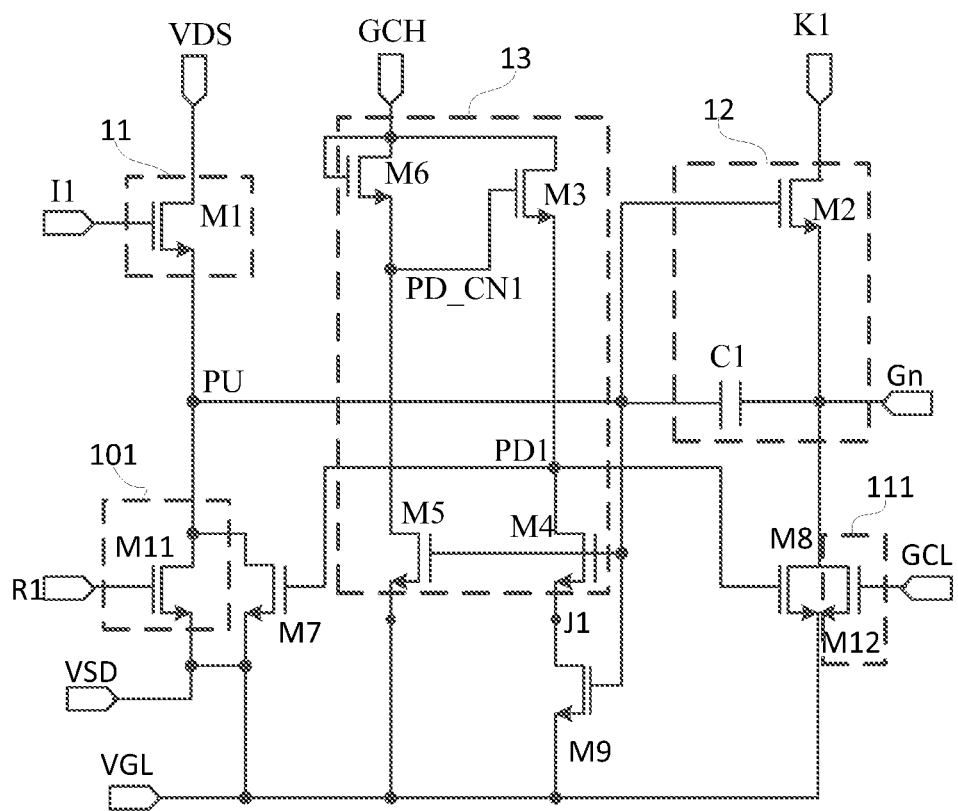
FIG. 16 is a circuit diagram of a gate driving circuit according to at least one embodiment of the present disclosure.

Differences between at least one embodiment of the gate driving circuit shown in FIG. 16 of the present disclosure and at least one embodiment of the gate driving circuit shown in FIG. 13 of the present disclosure are as follows: the tenth transistor M10 is not included; the source electrode of M5 is electrically connected to the low voltage terminal VGL.

Figure 17A:
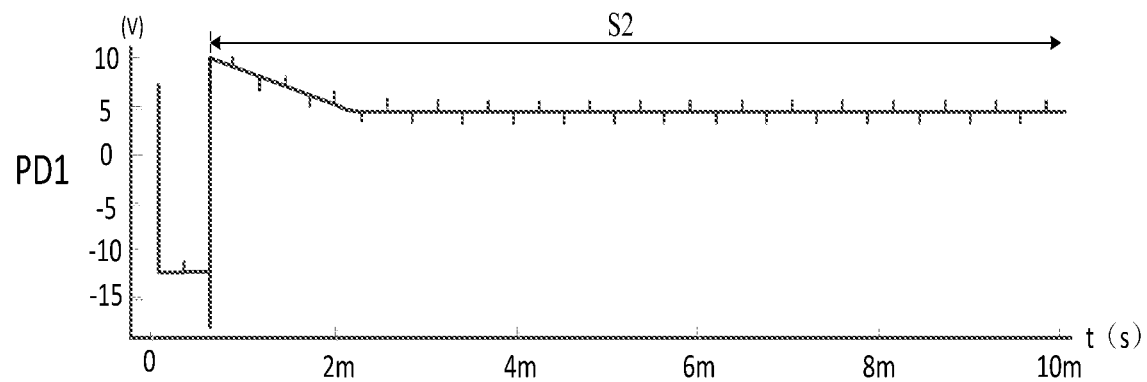
FIG. 17A is a simulation waveform diagram of the potential of the first pull-down node PD1 before the ninth transistor M9 and the tenth transistor M10 are added.
Figure 17B:
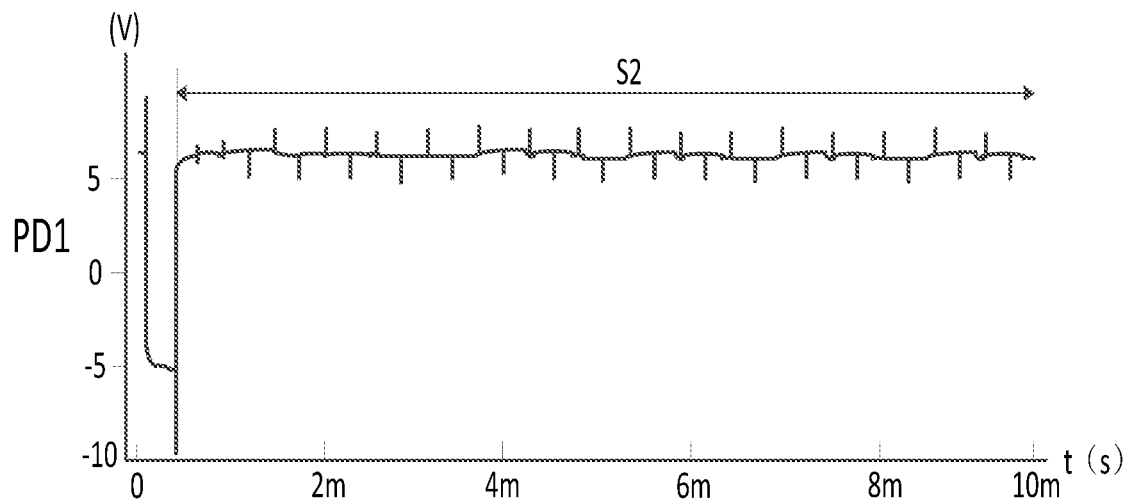
FIG. 17B is a simulation waveform diagram of the potential of the first pull-down node PD1 after the ninth transistor M9 and the tenth transistor M10 are added.

FIG. 17A is a simulation waveform diagram of the potential of the first pull-down node PD1 before M9 is added, and FIG. 17B is a simulation waveform diagram of the potential of the first pull-down node PD1 after M9 is added.

In FIGS. 17A and 17B, S2 is the second phase S2.

As shown in FIG. 17A, when the second phase S2 starts, the potential of the first pull-down node PD1 is pulled down. As shown in FIG. 17B, when the second phase S2 starts, the potential of the first pull-down node PD1 is not pulled down.

In FIGS. 17A and 17B, the horizontal axis is time t, and the unit is second(s).

Figure 18:
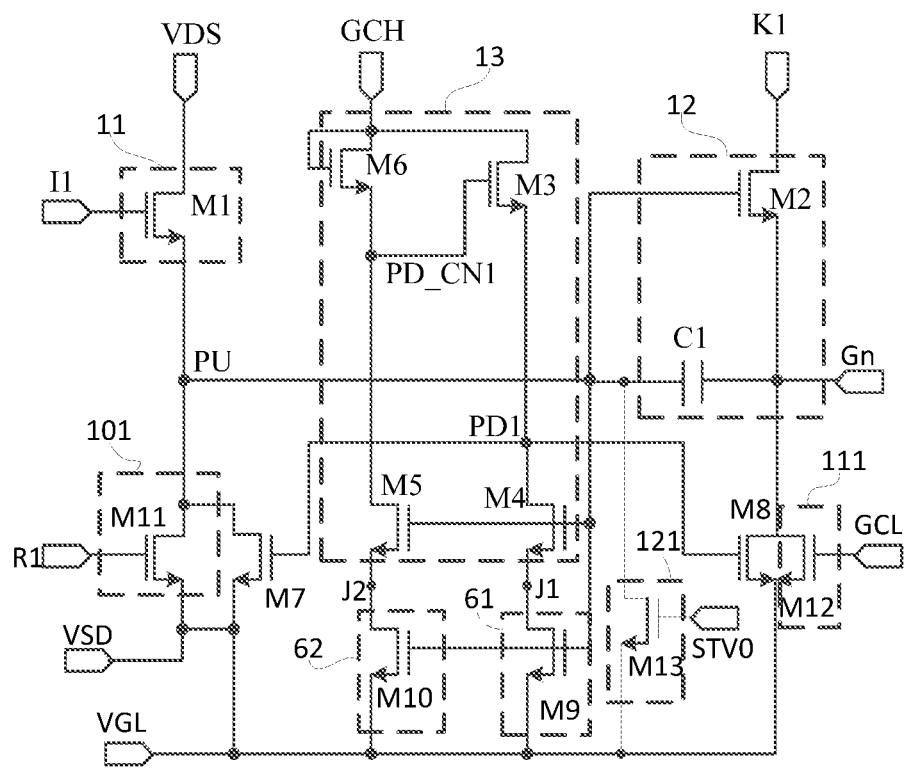
FIG. 18 is a circuit diagram of a gate driving circuit according to at least one embodiment of the present disclosure.

As shown in FIG. 18, on the basis of at least one embodiment of the gate driving circuit shown in FIG. 13 of the present disclosure, the gate driving circuit according to at least one embodiment of the present disclosure further includes an initial reset module 121; The initial reset module 121 includes a thirteenth transistor M13;

The gate electrode of the thirteenth transistor M13 is electrically connected to the initial signal terminal STV0, the drain electrode of the thirteenth transistor M13 is electrically connected to the pull-up node PU, and the source electrode of the thirteenth transistor M13 is electrically connected to the low voltage terminal VGL.

Compared with the related art, in at least one embodiment of the gate driving circuit shown in FIG. 18 of the present disclosure, only two transistors are added, which does not affect the design requirement of a narrow frame of a wearable product.

During operation of at least one embodiment of the gate driving circuit shown in FIG. 18 of the present disclosure, the wake-up phase of the display panel (the display panel includes the gate driving circuit) includes a first phase, a conversion phase and a second phase, the first phase is a phase where no data signal is written to the display panel, and the second phase is a phase where the data signal is written to the display panel;

In the first phase and the second phase, the timing sequence of the first control voltage provided by the GCH is the normal timing sequence;

During at least a part of the conversion phase, the potential of the trigger signal is a high voltage, and the potential of the first control voltage provided by the GCH is forcibly pulled up to a high voltage, so that M3 and M6 are turned on, so that the potential of the first pull-down node PD1 is a high voltage. At this time, in the first frame of time in the second phase S2, the potential of the first pull-down node PD1 is not pulled down, and there is no defect in the 20-day verification. The optimized measured waveform is shown in FIG. 19.

Figure 19:
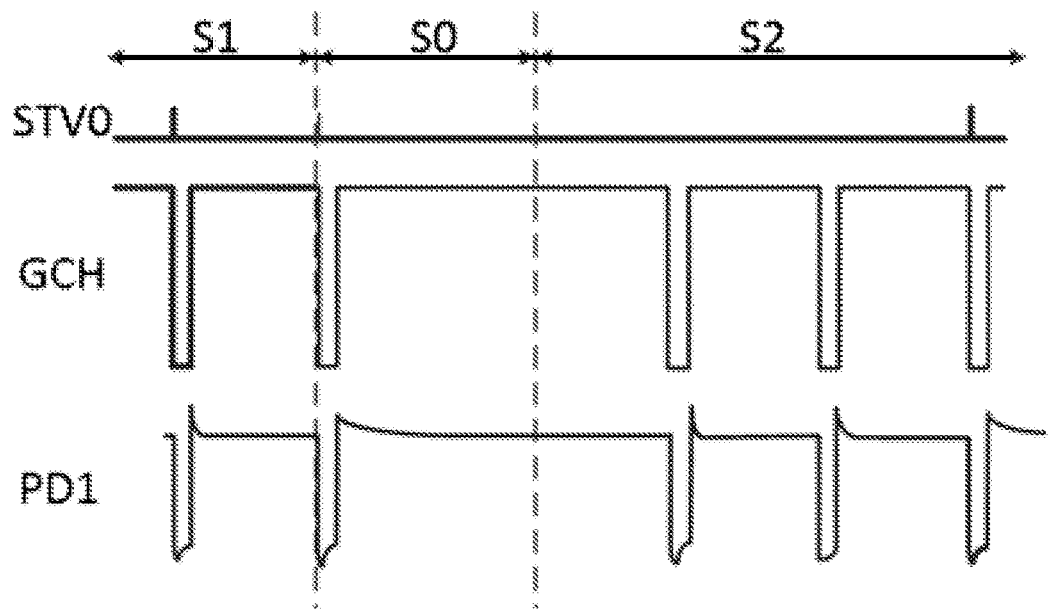
FIG. 19 is a timing diagram of the gate driving circuit shown in FIG. 18 according to at least one embodiment of the present disclosure.

In FIG. 19, the first phase is labeled S1, the conversion phase is labeled S0, and the second phase is labeled S2;

As shown in FIG. 19, at the beginning of the second phase S2, the potential of PD1 is not pulled down.

When at least one embodiment of the gate driving circuit shown in FIG. 18 of the present disclosure is in operation, the potential of the first control voltage can be forcibly pulled up in the conversion phase, or, the timing of the first control voltage provided by the GCH is the normal timing in the conversion phase.

Optionally, the gate driving circuit described in at least one embodiment of the present disclosure may further include a second pull-down node control module, a second pull-down node, a second noise reduction module, and a second suppression module;

The second pull-down node control module is respectively electrically connected to the fourth signal terminal, the second pull-down node, the second pull-down control node, the pull-up node, the third connection node and the fourth connection node, and is configured to input the signal provided by the fourth signal terminal to the second pull-down control node under the control of the fourth signal terminal, and control to connect the second pull-down control node and the fourth connection node under the control of the potential of the pull-up node, and input the signal provided by the fourth signal terminal to the second pull-down node under the control of the potential of the second pull-down control node, and control to connect the second pull-down node and the third connection node under the control of the potential of the pull-up node;

The second noise reduction module is respectively electrically connected to the pull-up node, the output terminal, the second pull-down node and the first level signal terminal, and is configured to input the signal provided by the first level signal terminal to the pull-up node and/or the output terminal under the control of the potential of the second pull-down node;

The second suppression module is electrically connected to the pull-up node, the third connection node, and the first level signal terminal, respectively, and is configured to input the signal provided by the first level signal terminal to the third connection node under the control of the potential of the pull-up node.

Optionally, the fourth signal terminal may be the third control voltage terminal GCH1, but not limited thereto.

During specific implementation, the gate driving circuit described in at least one embodiment of the present disclosure may include two pull-down nodes: a first pull-down node and a second pull-down node; the first pull-down node control module is used to control the potential of the first pull-down node, the second pull-down node control module is used to control the potential of the second pull-down node, so that the potential of the first pull-down node and the potential of the second pull-down node are alternately high voltages, so that the transistor whose gate electrode is connected to the first pull-down node and the second pull-down node can be turned on alternately, so as to improve the characteristic drift phenomenon of the transistors.

Figure 20:
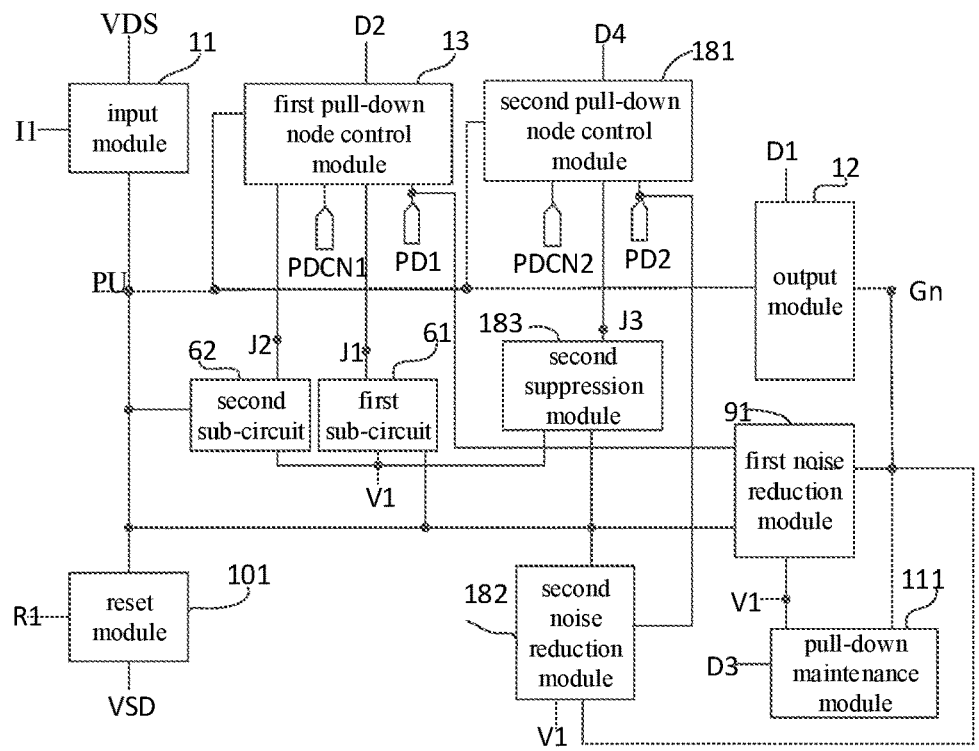
FIG. 20 is a structural diagram of a gate driving circuit according to at least one embodiment of the present disclosure.

As shown in FIG. 20, based on at least one embodiment of the gate driving circuit shown in FIG. 11 of the present disclosure, the gate driving circuit according to at least one embodiment of the present disclosure may further include a second pull-down node control module 181, a second pull-down node PD2, a second noise reduction module 182 and a second suppression module 183;

The second pull-down node control module 181 is respectively connected to the fourth signal terminal D4, the second pull-down node PD2, the second pull-down control node PD_CN2, the pull-up node PU, the third connection node J3 and the fourth connection node J4, is configured to input the signal provided by the fourth signal terminal D4 to the second pull-down control node PD_CN2 under the control of the fourth signal terminal D4, and controls to connect the second pull-down control node PD_CN2 and the fourth connection node J4 under the control the potential of the pull-up node PU, and input the signal provided by the fourth signal terminal D4 to the second pull-down node PD2 under the control of the potential of the second pull-down control node PD_CN2, and control to connect the second pull-down node PD2 and the third connection node J3 under the control of the potential of the pull-up node PU;

The second noise reduction module 182 is respectively electrically connected to the pull-up node PU, the output terminal Gn, the second pull-down node PD2 and the first level signal terminal V1, and is configured to input the signal provided by the first level signal terminal V1 to the pull-up node PU and the output terminal Gn under the potential control of the second pull-down node PD2;

The second suppression module 183 is electrically connected to the pull-up node PU, the third connection node J3 and the first level signal terminal V1 respectively, and is configured to input the signal provided by the first level signal terminal V1 to the third connection node J3 under the control of the potential of the pull-up node PU.

In at least one embodiment of the present disclosure, the second suppression module includes a third sub-circuit, the third sub-circuit is respectively connected to the pull-up node, the third connection node and the first level signal terminal, is configured to input the signal inputted by the first level signal terminal to the third connection node under the control of the potential of the pull-up node.

In a specific implementation, a third sub-circuit is arranged between the third connection node and the first level signal terminal, so as to reduce the leakage current between the second pull-down node and the first level signal terminal.

In at least one embodiment of the present disclosure, the second suppression module is further electrically connected to the fourth connection node, is configured to input the signal provided by the first level signal terminal to the fourth connection node under the control of the potential of the pull-up node;

The second suppression module further includes a fourth sub-circuit, the fourth sub-circuit is respectively electrically connected to the pull-up node, the fourth connection node and the first level signal terminal, and is configured to input the signal provided by the first level signal terminal to the fourth connection node under the control of the potential of the pull-up node.

In a specific implementation, a fourth sub-circuit is arranged between the fourth connection node and the first level signal terminal, so as to reduce the leakage current between the second pull-down control node and the first level signal terminal.

Figure 21:
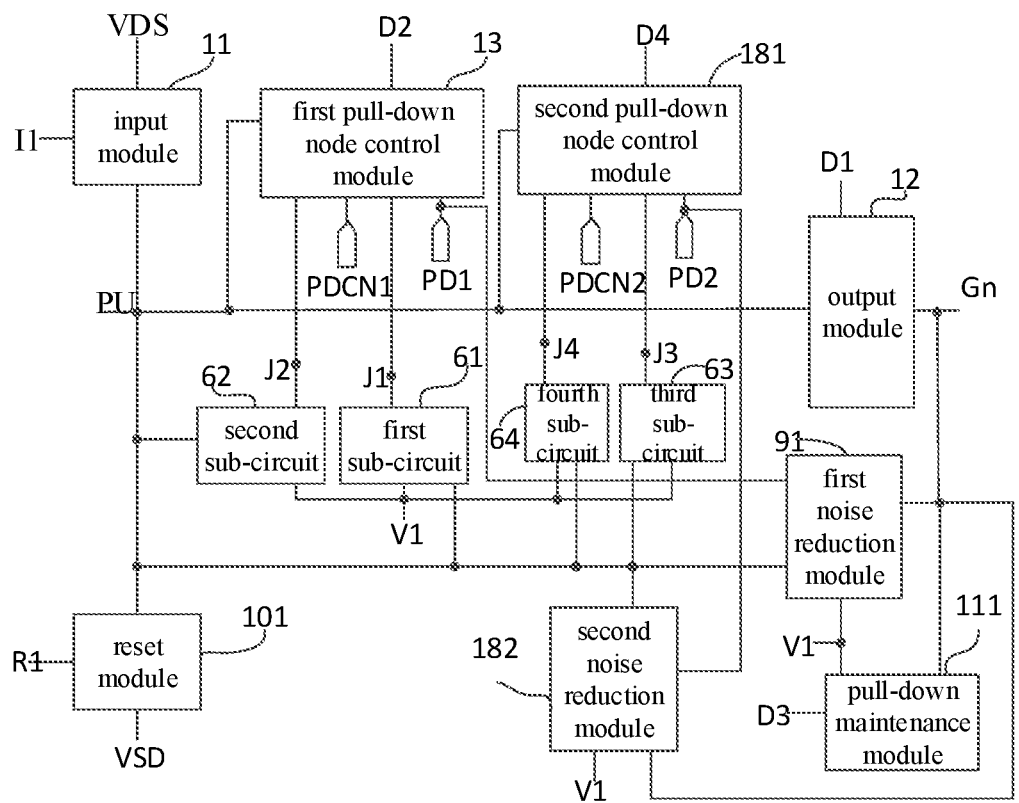
FIG. 21 is a structural diagram of a gate driving circuit according to at least one embodiment of the present disclosure.

As shown in FIG. 21, on the basis of at least one embodiment of the gate driving circuit shown in FIG. 20 of the present disclosure, in the gate driving circuit of at least one embodiment of the present disclosure, the second suppression module 183 is also electrically connected to the fourth connection node J4, is configured to input the signal provided by the first level signal terminal V1 to the fourth connection node J4 under the control of the potential of the pull-up node PU;

The second suppression module 183 includes a third sub-circuit 63 and a fourth sub-circuit 64;

The third sub-circuit 63 is electrically connected to the pull-up node PU, the third connection node J3 and the first level signal terminal V1 respectively, and is configured to input the signal provided by the first level signal terminal V1 to the third connection node J3 under the control of the potential of the pull-up node PU;

The fourth sub-circuit 64 is electrically connected to the pull-up node PU, the fourth connection node J4 and the first level signal terminal V1 respectively, and is configured to input the signal inputted by the first level signal terminal V1 to the fourth connection node J4 under the control of the potential of the pull-up node PU.

Optionally, the second pull-down node control module includes a fourteenth transistor, a fifteenth transistor, a sixteenth transistor, and a seventeenth transistor;

A gate electrode of the seventeenth transistor and a first electrode of the seventeenth transistor are both electrically connected to a fourth signal terminal, and a second electrode of the seventeenth transistor is electrically connected to a gate electrode of the fourteenth transistor; the second electrode of the seventeenth transistor is electrically connected to the second pull-down control node;

A first electrode of the fourteenth transistor is electrically connected to the fourth signal terminal, and a second electrode of the fourteenth transistor is electrically connected to the second pull-down node;

A gate electrode of the fifteenth transistor is electrically connected to the pull-up node, a first electrode of the fifteenth transistor is electrically connected to the second pull-down node, and a second electrode of the fifteenth transistor is electrically connected to the third connection node;

A gate electrode of the sixteenth transistor is electrically connected to a gate electrode of the fifteenth transistor and the pull-up node, and a first electrode of the sixteenth transistor is connected to a second electrode of the seventeenth transistor and a gate electrode of the fourteenth transistor, and a second electrode of the sixteenth transistor is electrically connected to the fourth connection node.

Optionally, the third sub-circuit includes an eighteenth transistor, and the fourth sub-circuit includes a nineteenth transistor;

A gate electrode of the eighteenth transistor is electrically connected to the pull-up node, a first electrode of the eighteenth transistor is electrically connected to the second electrode of the fifteenth transistor, and a second electrode of the eighteenth transistor is electrically connected to the first level signal terminal;

A gate electrode of the nineteenth transistor is electrically connected to the pull-up node and the gate electrode of the eighteenth transistor, and a first electrode of the nineteenth transistor is electrically connected to the second electrode of the sixteenth transistor, and a second electrode of the nineteenth transistor is electrically connected to the first level signal terminal.

Optionally, the second noise reduction module includes a twentieth transistor and a twenty-first transistor;

A gate electrode of the twentieth transistor is electrically connected to the second pull-down node, a first electrode of the twentieth transistor is electrically connected to the pull-up node, and a second electrode of the twentieth transistor is electrically connected to the first level signal terminal;

A gate electrode of the twenty-first transistor is electrically connected to the second pull-down node, a first electrode of the twenty-first transistor is electrically connected to the output terminal, and a second electrode of the twenty-first transistor is electrically connected to the first level signal terminal.

Figure 22:
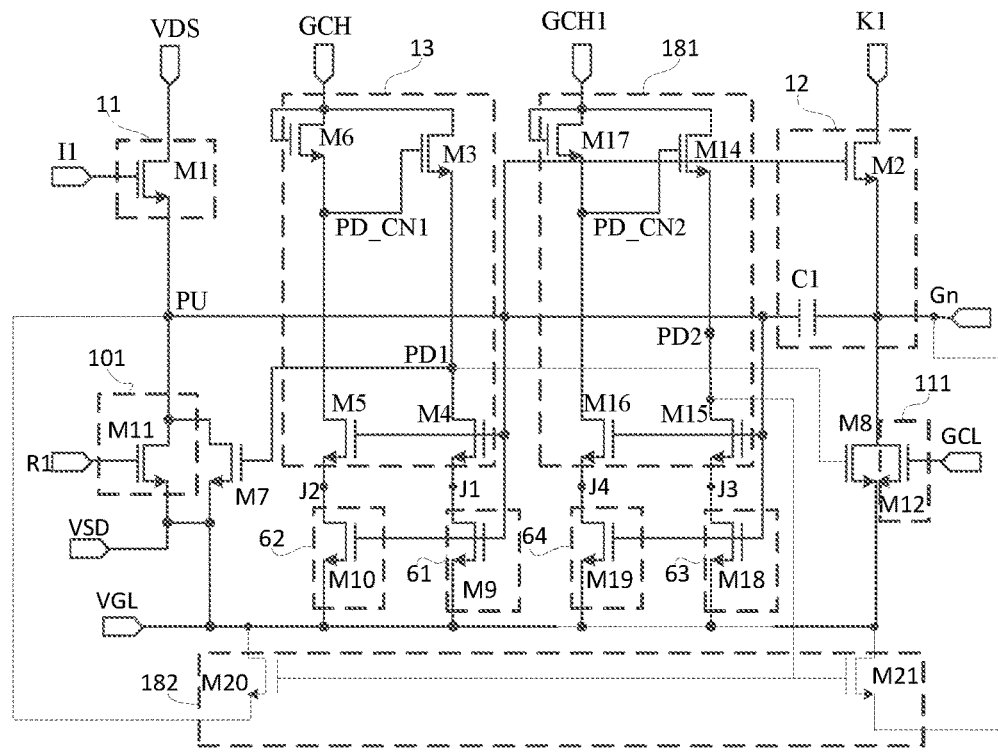
FIG. 22 is a circuit diagram of a gate driving circuit according to at least one embodiment of the present disclosure.

As shown in FIG. 22, on the basis of at least one embodiment of the gate driving circuit shown in FIG. 21 of the present disclosure, in the gate driving circuit of at least one embodiment of the present disclosure, the input module 11 includes a first a transistor M1;

The gate electrode of the first transistor M1 is electrically connected to the input control terminal I1, the drain electrode of the first transistor M1 is electrically connected to the first input terminal VDS, and the source electrode of the first transistor M1 is electrically connected to the pull-up node PU;

The output module 12 includes a second transistor M2 and a first capacitor C1;

The gate electrode of the second transistor M2 is electrically connected to the pull-up node PU, the drain electrode of the second transistor M2 is electrically connected to the clock signal terminal K1, and the source electrode of the second transistor M2 is electrically connected to the output terminal Gn;

The first electrode plate of the first capacitor C1 is electrically connected to the pull-up node PU, and the second electrode plate of the first capacitor C1 is electrically connected to the output terminal Gn;

The first pull-down node control module 13 includes a third transistor M3, a fourth transistor M4, a fifth transistor M5 and a sixth transistor M6;

The gate electrode of the sixth transistor M6 and the drain electrode of the sixth transistor M6 are both electrically connected to the first control voltage terminal GCH, and the source electrode of the sixth transistor M6 is electrically connected to the gate electrode of the third transistor M3; the gate electrode of the third transistor M3 is electrically connected to the first pull-down control node PD_CN1;

The drain electrode of the third transistor M3 is electrically connected to the first control voltage terminal GCH, and the source electrode of the third transistor M3 is electrically connected to the first pull-down node PD1;

The gate electrode of the fourth transistor M4 is electrically connected to the pull-up node PU, the drain electrode of the fourth transistor M4 is electrically connected to the first pull-down node PD1, and the source electrode of the fourth transistor M4 is electrically connected to the first connection node J1;

The gate electrode of the fifth transistor M5 and the gate electrode of the fourth transistor M4 are both electrically connected to the pull-up node PU, and the drain electrode of the fifth transistor M5 and the source electrode of the sixth transistor M6 are both electrically connected to the gate electrode of the third transistor M3, and the source electrode of the fifth transistor M5 is electrically connected to the second connection node J2;

The first noise reduction module 91 includes a seventh transistor M7 and an eighth transistor M8;

The gate electrode of the seventh transistor M7 is electrically connected to the first pull-down node PD1, the drain electrode of the seventh transistor M7 is electrically connected to the pull-up node PU, and the source electrode of the seventh transistor M7 is electrically connected to the low voltage terminal VGL;

The gate electrode of the eighth transistor M8 is electrically connected to the first pull-down node PD1, the drain electrode of the eighth transistor M8 is electrically connected to the output terminal Gn, and the source electrode of the eighth transistor M8 is electrically connected to the low voltage terminal VGL; The first sub-circuit 61 includes a ninth transistor M9;

The gate electrode of the ninth transistor M9 is electrically connected to the pull-up node PU, the drain electrode of the ninth transistor M9 is electrically connected to the source electrode of the fourth transistor M4, and the source electrode of the ninth transistor M9 electrically connected to the low voltage terminal VGL;

The second sub-circuit 62 includes a tenth transistor M10;

The gate electrode of the tenth transistor M10 is electrically connected to the pull-up node PU and the gate electrode of the ninth transistor M9, and the drain electrode of the tenth transistor M10 is electrically connected to the source electrode of the fifth transistor M5, the source electrode of the tenth transistor M10 is electrically connected to the low voltage terminal VGL;

The reset module 101 includes an eleventh transistor M11;

The gate electrode of the eleventh transistor M11 is electrically connected to the reset signal terminal R1, the drain electrode of the eleventh transistor M11 is electrically connected to the pull-up node PU, and the source electrode of the eleventh transistor M11 electrically connected to the second input terminal VSD;

The pull-down maintenance module 111 includes a twelfth transistor M12;

The gate electrode of the twelfth transistor M12 is electrically connected to the second control voltage terminal GCL, the drain electrode of the twelfth transistor M12 is electrically connected to the output terminal Gn, and the source electrode of the twelfth transistor M12 is electrically connected to the low voltage terminal VGL;

The second pull-down node control module 181 includes a fourteenth transistor M14, a fifteenth transistor M15, a sixteenth transistor M16 and a seventeenth transistor M17;

The gate electrode of the seventeenth transistor M17 and the drain electrode of the seventeenth transistor M17 are both electrically connected to the third control voltage terminal GCH1, and the source electrode of the seventeenth transistor M17 is electrically connected to the gate electrode of the fourteenth transistor M14; the source electrode of the seventeenth transistor M17 is electrically connected to the second pull-down control node PD_CN2;

The drain electrode of the fourteenth transistor M14 is electrically connected to the third control voltage terminal GCH1, and the source electrode of the fourteenth transistor M14 is electrically connected to the second pull-down node PD2;

The gate electrode of the fifteenth transistor M15 is electrically connected to the pull-up node PU, the drain electrode of the fifteenth transistor M15 is electrically connected to the second pull-down node PD2, and the source electrode of the fifteenth transistor M15 is electrically connected to the third connection node J3;

The gate electrode of the sixteenth transistor M16 is electrically connected to the gate electrode of the fifteenth transistor M15 and the pull-up node PU, and the drain electrode of the sixteenth transistor M16 and the source electrode of the seventeenth transistor M17 are all electrically connected to the gate electrode of the fourteenth transistor M14, and the source electrode of the sixteenth transistor M16 is electrically connected to the fourth connection node J4;

The third sub-circuit 63 includes an eighteenth transistor M18, and the fourth sub-circuit 64 includes a nineteenth transistor M19;

The gate electrode of the eighteenth transistor M18 is electrically connected to the pull-up node PU, the drain electrode of the eighteenth transistor M18 is electrically connected to the source electrode of the fifteenth transistor M15, and the source electrode of the eighteenth transistor M18 is electrically connected to the low voltage terminal VGL;

The gate electrode of the nineteenth transistor M19 and the pull-up node PU are both electrically connected to the gate electrode of the eighteenth transistor M18, and the drain electrode of the nineteenth transistor M19 is electrically connected to the source electrode of the sixteenth transistor M16, the source electrode of the nineteenth transistor M19 is electrically connected to the low voltage terminal VGL;

The second noise reduction module 182 includes a twentieth transistor M20 and a twenty-first transistor M21;

The gate electrode of the twentieth transistor M20 is electrically connected to the second pull-down node PD2, the drain electrode of the twentieth transistor M20 is electrically connected to the pull-up node PU, and the source electrode of the twentieth transistor M20 is electrically connected to the low voltage terminal VGL;

The gate electrode of the twenty-first transistor M21 is electrically connected to the second pull-down node PD2, the drain electrode of the twenty-first transistor M21 is electrically connected to the output terminal Gn, and the source electrode of the twenty-first transistor M21 is electrically connected to the low voltage terminal VGL.

In at least one embodiment of the gate driving circuit shown in FIG. 22, all transistors are n-type transistors, but not limited thereto.

In at least one embodiment of the gate driving circuit shown in FIG. 22 of the present disclosure, the first signal terminal is the clock signal terminal K1, the second signal terminal is the first control voltage terminal GCH, and the third signal terminal may be the second control voltage terminal GCL, the fourth signal terminal shown may be the third control voltage terminal VGH1, and the first level signal terminal may be the low voltage terminal VGL, but not limited thereto.

In at least one embodiment of the gate driving circuit shown in FIG. 22, a ninth transistor M9 is provided between the first connection node J1 and the low voltage terminal VGL, and a tenth transistor M10 is provided between the second connection node J2 and the low voltage terminal VGL; an eighteenth transistor M18 is provided between the third connection node J3 and the low voltage terminal VGL, and a nineteenth transistor M19 is provided between the fourth connection node J4 and the low voltage terminal VGL, and that is, the fourth transistor M4 and the ninth transistor M9 connected in series are arranged between the first pull-down node PD1 and the low voltage terminal VGL, and the fifth transistor M5 and the tenth transistor M10 connected in series are arranged between the first pull-down control node PD_CN1 and the low voltage terminal VGL, to reduce the leakage current between the first node PD1 and the low voltage terminal VGL, reduce the leakage current between the first pull-down node PD_CN1 and the low voltage terminal VGL. The fifteenth transistor M15 and the twentieth transistor M20 connected in series are arranged between the second pull-down node PD2 and the low voltage terminal VGL, and a sixteenth transistor M16 and twenty-first transistor M21 connected in series are arranged between the second pull-down control node PD_CN2 and the low voltage terminal VGL, to reduce the leakage current between the second node PD2 and the low voltage terminal VGL, and reduce the leakage current between the second pull-down control node PD_CN2 and the low voltage terminal VGL, so that in the conversion phase, the potentials of the first pull-down node PD1 and the second pull-down node will not be greatly pulled down, so when the second phase starts, the potential of the first pull-down node PD1 can be raised to prevent the horizontal stripe from occurring.

When at least one embodiment of the gate driving circuit shown in FIG. 22 of the present disclosure is in operation, the potential of the first control voltage and the third control voltage may be forcibly pulled up in the conversion phase, or the timing of the first control voltage provided by the GCH and the third control voltage provided by the GCH1 are normal timing in the conversion phase.

In at least one embodiment of the gate driving circuit shown in FIG. 22 of the present disclosure, when the first input terminal VDS provides a high voltage signal and the second input terminal VSD provides a low voltage signal, the shift register including the gate driving circuit can perform forward scanning;

When the first input terminal VDS provides a low voltage signal and the second input terminal VSD provides a high voltage signal, the shift register including the gate driving circuit can perform reverse scanning;

At least one embodiment of the gate driving circuit shown in FIG. 22 of the present disclosure is capable of performing bidirectional scanning.

Figure 23:
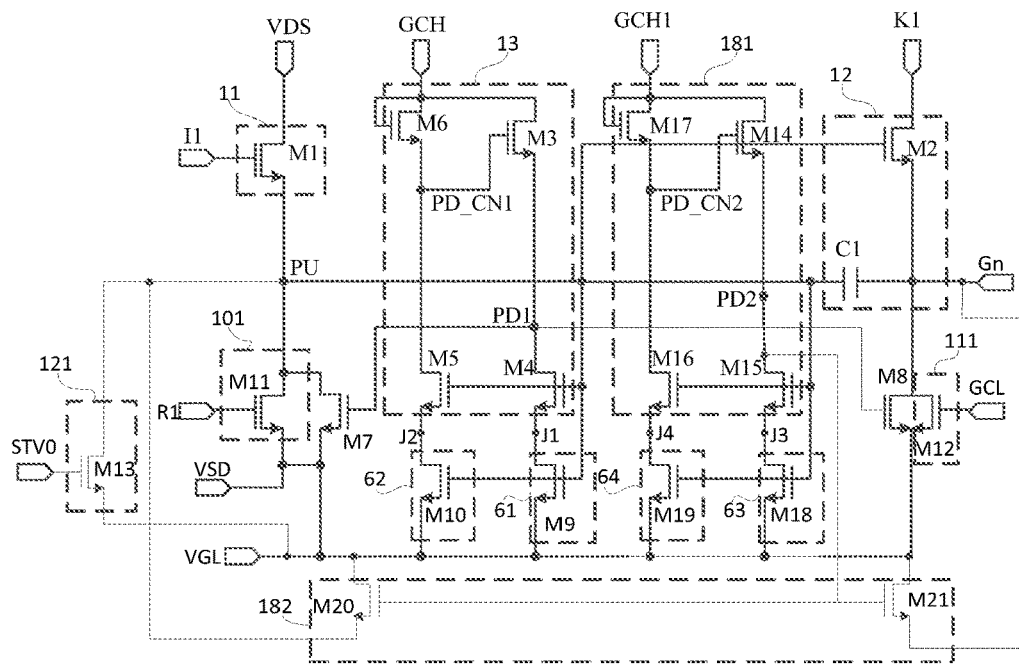
FIG. 23 is a circuit diagram of a gate driving circuit according to at least one embodiment of the present disclosure.

As shown in FIG. 23, on the basis of at least one embodiment of the gate driving circuit shown in FIG. 22 of the present disclosure, the gate driving circuit according to at least one embodiment of the present disclosure further includes an initial reset module 121;

The initial reset module 121 includes a thirteenth transistor M13;

The gate electrode of the thirteenth transistor M13 is electrically connected to the initial signal terminal STV0, the drain electrode of the thirteenth transistor M13 is electrically connected to the pull-up node PU, and the source electrode of the thirteenth transistor M13 is electrically connected to the low voltage terminal VGL.

The shift register according to the embodiment of the present disclosure includes a plurality of stages of gate driving circuits described above.

The display panel according to the embodiment of the present disclosure includes the above-mentioned shift register.

The driving method for a display panel according to the embodiment of the present disclosure is used for driving the display panel, and the working period of the display panel includes a wake-up phase, wherein the wake-up phase includes a first phase, a conversion phase and a second phase, and the first phase is the phase where no data signal is written to the display panel, and the second phase is the phase where the data signal is written to the display panel;

The display panel includes a plurality of gate driving circuits connected in series, the gate driving circuits include an input module, a pull-up node, an output module, a first pull-down node, and a first pull-down node control module;

The input module is electrically connected to an input control terminal, a first input terminal and the pull-up node respectively, and is configured to input a signal inputted by the first input terminal into the pull-up node under the control of the first input control terminal;

The output module is electrically connected to the pull-up node, the first signal terminal and an output terminal respectively, and is configured to output the signal inputted by the first signal terminal through the output terminal under the control of the potential of the pull-up node;

The first pull-down node control module is electrically connected to a second signal terminal, a first pull-down control node, a first pull-down node, the pull-up node, a first connection node and a second connection node, respectively, and is configured to input a signal provided by the second signal terminal to the first pull-down control node under the control of the second signal terminal, and control to connect the first pull-down control node and the second connection node under the control of the potential of the pull-up node, and input the signal provided by the second signal terminal to the first pull-down node under the control of a potential of the first pull-down control node and control to connect the first pull-down node and the first connection node under the control of the potential of the pull-up node The driving method of the display panel includes:

During at least a part of the conversion phase, inputting an active level to the second signal terminal under the control of the trigger signal, so that the first pull-down node control module controls to pull up the potential of the first pull-down node.

In the driving method of the display panel according to the embodiment of the present disclosure, during at least part of the time included in the conversion phase, an active level is input to the second signal terminal under the control of a trigger signal, so that the first pull-down node control module controls to pull up the potential of the first pull-down node, thereby ensuring that the potential of the first pull-down node can be maintained when the second phase starts.

The driving method of the display panel described in the embodiment of the present disclosure may be applied to the display panel described in at least one embodiment of the present disclosure, that is, the display panel to which the driving method of the display panel described in the embodiment of the present disclosure is applied may include the driving circuit described in at least one embodiment of the present disclosure, but not limited thereto. In actual operation, the driving method of the display panel described in the embodiment of the present disclosure may not be applied to the display panel described in at least one embodiment of the present disclosure, as long as the gate driving circuit in the display panel includes an input module, a pull-down node, an output module, a first pull-down node, and a first pull-down node control module.

The method for driving a display panel according to at least one embodiment of the present disclosure may include:

In the conversion phase, inputting the active level to the second signal terminal under the control of the trigger signal.

In at least one embodiment of the present disclosure, when the transistor included in the gate driving circuit whose gate electrode is electrically connected to the second signal terminal is an n-type transistor, the active level may be a high voltage. When the transistor included in the gate driving circuit whose gate electrode is electrically connected to the second signal terminal is a p-type transistor, the active level may be a low voltage.

In the driving method of the display panel described in at least one embodiment of the present disclosure, an active level may be input to the second signal terminal during the entire conversion phase, so that the first pull-down node control module controls to pull up the potential of the first pull-down node to ensure that the potential of the first pull-down node can be maintained when the second phase starts.

In at least one embodiment of the present disclosure, the gate driving circuit further includes a second pull-down node control module; the driving method of the display panel may further include:

When an active level is input to the second signal terminal, controlling, by the second pull-down node control module, to pull up the potential of the second node.

In at least one embodiment of the present disclosure, the step of inputting an active level to the second signal terminal under the control of a trigger signal includes:

Converting the trigger signal from a first voltage signal to a second voltage signal, so as to control to input the active level to the second signal terminal.

Optionally, the first voltage signal may be a low voltage signal, and the second voltage signal may be a high voltage signal, but not limited thereto.

Figure 24:
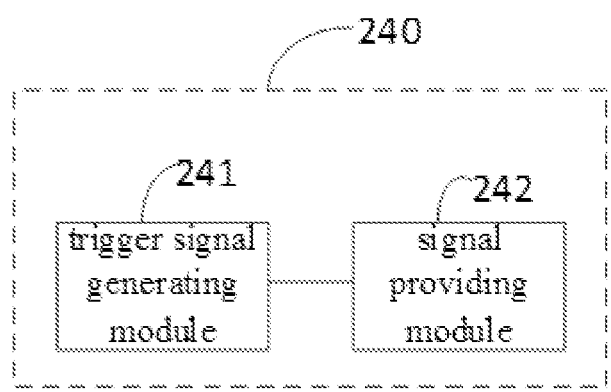
FIG. 24 is a structural diagram of a driver chip in a display device according to an embodiment of the present disclosure.

The display device according to the embodiment of the present disclosure includes the above-mentioned display panel. As shown in FIG. 24, the display device further includes a driver chip 240, and the driver chip 240 includes a trigger signal generating module 241 and a signal providing module 242;

The trigger signal generating module 241 is configured to generate a trigger signal to the signal providing module 242;

The signal providing module 242 is configured to control to input the active level to the second signal terminal under the control of the trigger signal during at least part of the conversion phase, so that the first pull-down node control module can pull up the potential of the first pull-down node.

Optionally, the trigger signal generating module 241 is electrically connected to the signal providing module 242 and is configured to generate a trigger signal to the signal providing module 242.

Optionally, the trigger signal generating module generates a trigger signal in the conversion phase, and the driving chip controls the signal providing module to input an active level to the second signal terminal.

Optionally, the driver chip may be a timing controller or a source driver chip (source IC), etc., which is not limited herein.

The display device according to the embodiment of the present disclosure may further include a driver chip 240, the driver chip 240 may include the trigger signal generating module 241 for generating a trigger signal, and the signal providing module 242 for receiving the trigger signal and inputting the active level to the second signal terminal during at least part of time included in the conversion phase.

The display device provided by the embodiment of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A gate driving circuit, comprising an input module, a pull-up node, an output module, a first pull-down node, a first pull-down node control module and a first suppression module; wherein
the input module is electrically connected to an input control terminal, a first input terminal and the pull-up node respectively, and is configured to input a signal inputted by the first input terminal into the pull-up node under the control of a first input control terminal;
the output module is electrically connected to the pull-up node, a first signal terminal and an output terminal respectively, and is configured to output a signal inputted by the first signal terminal through the output terminal under the control of a potential of the pull-up node;
the first pull-down node control module is electrically connected to a second signal terminal, a first pull-down control node, a first pull-down node, the pull-up node and a first connection node, respectively, and is configured to control a potential of the first pull-down control node under the control of the second signal terminal and the potential of the pull-up node, and is configured to control to connect the first connection node and the first pull-down node under the control of the potential the pull-up node, and is configured to input a signal provided by the second signal terminal to the first pull-down node under the control of the potential of the first pull-down control node;
the first suppression module is respectively electrically connected to the pull-up node, the first connection node and a first level signal terminal, and is configured to input a signal provided by the first level signal terminal to the first connection node under the control of the potential of pull-up node;
wherein the first suppression module includes a first sub-circuit; the first sub-circuit is electrically connected to the pull-up node, the first connection node and the first level signal terminal respectively, and is configured to input the signal inputted by the first level signal terminal into the first connection node under the control of the potential of the pull-up node;
wherein the first pull-down node control module is electrically connected to the second connection node, and is configured to input the signal provided by the second signal terminal to the first pull-down control node under the control of the second signal terminal, and control to connect the first pull-down control node and the second connection node under the control of the potential of the pull-up node;
the first suppression module is also electrically connected to the second connection node, is configured to input the signal provided by the first level signal terminal to the second connection node under the control of the potential of the pull-up node;
wherein the first pull-down node control module and the first suppression module are independent of each other and are connected via the first connection node;
wherein the first signal terminal and the second signal terminal are different signal terminals; and
wherein the gate drive circuit comprises a plurality of transistors, and a structure of each of the transistors is a single-gate structure.

2. The gate driving circuit according to claim 1, wherein the first suppression module further includes a second sub-circuit, the second sub-circuit is respectively connected to the pull-up node, the second connection node and the first level signal terminal, and is configured to input the signal inputted by the first level signal terminal to the second connection node under the control of the potential of the pull-up node.

3. The gate driving circuit according to claim 1, further comprising a first noise reduction module; wherein
the first noise reduction module is electrically connected to the pull-up node, the output terminal, the first pull-down node and the first level signal terminal, respectively, and is configured to input the signal provided by the first level signal terminal to the pull-up node and/or the output terminal under the control of the potential of the first pull-down node,
or the gate driving circuit further comprises a reset module, wherein the reset module is electrically connected to the pull-up node, the second input terminal and the reset signal terminal respectively, and is configured to input the signal inputted by the second input terminal to the pull-up node under the control of the reset signal terminal;
or
the gate driving circuit further comprises a pull-down maintenance module, wherein the pull-down maintenance module is electrically connected to the output terminal, the third signal terminal and the first level signal terminal respectively, and is configured to input the signal inputted by the first level signal terminal to the output terminal under the control of the third signal terminal.

4. The gate driving circuit according to claim 3, wherein the reset module includes an eleventh transistor, a gate electrode of the eleventh transistor is electrically connected to the reset signal terminal, and a first electrode of the eleventh transistor is electrically connected to the pull-up node, a second electrode of the eleventh transistor is electrically connected to the second input terminal.

5. The gate driving circuit according to claim 3, wherein the pull-down maintenance module includes a twelfth transistor, a gate electrode of the twelfth transistor is electrically connected to the third signal terminal, and a first electrode of the twelfth transistor is electrically connected to the output terminal, and a second electrode of the twelfth transistor is electrically connected to the first level signal terminal.

6. The gate driving circuit according to claim 1, further comprising an initial reset module, wherein the initial reset module is electrically connected to the pull-up node, an initial signal terminal, and the first level signal terminal, respectively, and is configured to input the signal inputted by the first level signal terminal to the pull-up node under the control of the initial signal terminal.

7. The gate driving circuit according to claim 6, wherein the input module comprises a first transistor, a gate electrode of the first transistor is electrically connected to the input control terminal, a first electrode of the first transistor is electrically connected to the first input terminal, and a second electrode of the first transistor is electrically connected to the pull-up node.

8. The gate driving circuit according to claim 7, wherein the output module comprises a second transistor and a first capacitor;
a gate electrode of the second transistor is electrically connected to the pull-up node, a first electrode of the second transistor is electrically connected to the first signal terminal, and a second electrode of the second transistor is electrically connected to the output terminal;
a first electrode plate of the first capacitor is electrically connected to the pull-up node, and a second electrode plate of the first capacitor is electrically connected to the output terminal.

9. The gate driving circuit according to claim 8, wherein the first pull-down node control module comprises a third transistor, a fourth transistor, a fifth transistor and a sixth transistor;
a gate electrode of the sixth transistor and a first electrode of the sixth transistor are both electrically connected to the second signal terminal, and a second electrode of the sixth transistor is electrically connected to a gate electrode of the third transistor; the gate electrode of the third transistor is electrically connected to the first pull-down control node;
a first electrode of the third transistor is electrically connected to the second signal terminal, and a second electrode of the third transistor is electrically connected to the first pull-down node;
a gate electrode of the fourth transistor is electrically connected to the pull-up node, a first electrode of the fourth transistor is electrically connected to the first pull-down node, and a second electrode of the fourth transistor is electrically connected to the first connection node;
a gate electrode of the fifth transistor and the gate electrode of the fourth transistor are both electrically connected to the pull-up node, and a first electrode of the fifth transistor and the second electrode of the sixth transistor are both electrically connected to the gate electrode of the third transistor, and a second electrode of the fifth transistor is electrically connected to the second connection node,
wherein the gate driving circuit further comprises a first noise reduction module;
the first noise reduction module includes a seventh transistor and an eighth transistor;
a gate electrode of the seventh transistor is electrically connected to the first pull-down node, a first electrode of the seventh transistor is electrically connected to the pull-up node, and a second electrode of the seventh transistor is electrically connected to the first level signal terminal;
a gate electrode of the eighth transistor is electrically connected to the first pull-down node, a first electrode of the eighth transistor is electrically connected to the output terminal, and a second electrode of the eighth transistor is electrically connected to the first level signal terminal,
wherein the first sub-circuit comprises a ninth transistor, a gate electrode of the ninth transistor is electrically connected to the pull-up node, and a first electrode of the ninth transistor is electrically connected to a second electrode of the fourth transistor, and a second electrode of the ninth transistor is electrically connected to the first level signal terminal,
wherein the first suppression module further comprises a second sub-circuit, the second sub-circuit comprises a tenth transistor, a gate electrode of the tenth transistor is electrically connected to the pull-up node and the gate electrode of the ninth transistor, and a first electrode of the tenth transistor is electrically connected to the second electrode of the fifth transistor, and a second electrode of the tenth transistor is electrically connected to the first level signal terminal.

10. The gate driving circuit according to claim 6, wherein the initial reset module includes a thirteenth transistor, a gate electrode of the thirteenth transistor is electrically connected to the initial signal terminal, and a first electrode of the thirteenth transistor is electrically connected to the pull-up node, and a second electrode of the thirteenth transistor is electrically connected to the first level signal terminal.

11. The gate driving circuit according to claim 1, further comprising a second pull-down node control module, a second pull-down node, a second noise reduction module and a second suppression module; wherein the second pull-down node control module is respectively electrically connected to a fourth signal terminal, the second pull-down node, a second pull-down control node, the pull-up node, a third connection node and a fourth connection node, and is configured to input a signal provided by the fourth signal terminal to the second pull-down control node under the control of the fourth signal terminal, and control to connect the second pull-down control node and the fourth connection node under the control of the potential of the pull-up node, and input the signal provided by the fourth signal terminal to the second pull-down node under the control of a potential of the second pull-down control node, and control to connect the second pull-down node and the third connection node under the control of the potential of the pull-up node;

the second noise reduction module is respectively electrically connected to the pull-up node, the output terminal, the second pull-down node and the first level signal terminal, and is configured to input the signal provided by the first level signal terminal to the pull-up node and/or the output terminal under the control of the potential of the second pull-down node;

the second suppression module is electrically connected to the pull-up node, the third connection node, and the first level signal terminal, respectively, and is configured to input the signal provided by the first level signal terminal to the third connection node under the control of the potential of the pull-up node.

12. The gate driving circuit according to claim 11, wherein the second suppression module comprises a third sub-circuit, the third sub-circuit is respectively connected to the pull-up node, the third connection node and the first level signal terminal, is configured to input the signal inputted by the first level signal terminal to the third connection node under the control of the potential of the pull-up node, wherein the second suppression module is further electrically connected to the fourth connection node, and is configured to input the signal provided by the first level signal terminal to the fourth connection node under the control of the potential of the pull-up node;

the second suppression module further includes a fourth sub-circuit, the fourth sub-circuit is respectively electrically connected to the pull-up node, the fourth connection node and the first level signal terminal, and is configured to input the signal provided by the first level signal terminal to the fourth connection node under the control of the potential of the pull-up node, wherein the second pull-down node control module comprises a fourteenth transistor, a fifteenth transistor, a sixteenth transistor and a seventeenth transistor;

a gate electrode of the seventeenth transistor and a first electrode of the seventeenth transistor are both electrically connected to a fourth signal terminal, and a second electrode of the seventeenth transistor is electrically connected to a gate electrode of the fourteenth transistor; the second electrode of the seventeenth transistor is electrically connected to the second pull-down control node;

a first electrode of the fourteenth transistor is electrically connected to the fourth signal terminal, and a second electrode of the fourteenth transistor is electrically connected to the second pull-down node;

a gate electrode of the fifteenth transistor is electrically connected to the pull-up node, a first electrode of the fifteenth transistor is electrically connected to the second pull-down node, and a second electrode of the fifteenth transistor is electrically connected to the third connection node;

a gate electrode of the sixteenth transistor is electrically connected to the gate electrode of the fifteenth transistor and the pull-up node, and a first electrode of the sixteenth transistor is connected to the second electrode of the seventeenth transistor and the gate electrode of the fourteenth transistor, and a second electrode of the sixteenth transistor is electrically connected to the fourth connection node, wherein the third sub-circuit comprises an eighteenth transistor and the fourth sub-circuit comprises a nineteenth transistor;

a gate electrode of the eighteenth transistor is electrically connected to the pull-up node, a first electrode of the eighteenth transistor is electrically connected to the second electrode of the fifteenth transistor, and a second electrode of the eighteenth transistor is electrically connected to the first level signal terminal;

a gate electrode of the nineteenth transistor is electrically connected to the pull-up node and the gate electrode of the eighteenth transistor, and a first electrode of the nineteenth transistor is electrically connected to the second electrode of the sixteenth transistor, and a second electrode of the nineteenth transistor is electrically connected to the first level signal terminal.

13. The gate driving circuit according to claim 11, wherein the second noise reduction module comprises a twentieth transistor and a twenty-first transistor;

a gate electrode of the twentieth transistor is electrically connected to the second pull-down node, a first electrode of the twentieth transistor is electrically connected to the pull-up node, and a second electrode of the twentieth transistor is electrically connected to the first level signal terminal;

a gate electrode of the twenty-first transistor is electrically connected to the second pull-down node, a first electrode of the twenty-first transistor is electrically connected to the output terminal, and a second electrode of the twenty-first transistor is electrically connected to the first level signal terminal.

14. A shift register comprising a plurality of gate driving circuits connected in series according to claim 1.

15. A display panel comprising the shift register according to claim 14.

16. A display device, comprising the display panel according to claim 15, wherein the display device further comprises a driver chip, the driver chip comprises a trigger signal generating module and a signal providing module;

the trigger signal generating module is configured to generate a trigger signal to the signal providing module;

the signal providing module is configured to control to input an active level to the second signal terminal under the control of the trigger signal during at least part of the conversion phase, so that the first pull-down node control module pulls up the potential of the first pull-down node.

17. A method for driving a display panel, wherein a working period of the display panel includes a wake-up phase, the wake-up phase includes a first phase, a conversion phase and a second phase, and the first phase is a phase where no data signal is written to the display panel, and the second phase is a phase where the data signal is written to the display panel;

the display panel includes a plurality of gate driving circuits connected in series, the gate driving circuits include an input module, a pull-up node, an output module, a first pull-down node, a first pull-down node control module, and a first suppression module;

the input module is electrically connected to an input control terminal, a first input terminal and the pull-up node respectively, and is configured to input a signal inputted by the first input terminal into the pull-up node under the control of a first input control terminal;

the output module is electrically connected to the pull-up node, a first signal terminal and an output terminal respectively, and is configured to output a signal inputted by the first signal terminal through the output terminal under the control of a potential of the pull-up node;

the first pull-down node control module is electrically connected to a second signal terminal, a first pull-down control node, a first pull-down node, the pull-up node, a first connection node and a second connection node, respectively, and is configured to input a signal provided by the second signal terminal to the first pull-down control node under the control of the second signal terminal, and control to connect the first pull-down control node and the second connection node under the control of the potential of the pull-up node, and input the signal provided by the second signal terminal to the first pull-down node under the control of a potential of the first pull-down control node and control to connect the first pull-down node and the first connection node under the control of the potential of the pull-up node;

the first suppression module is respectively electrically connected to the pull-up node, the first connection node and a first level signal terminal, and is configured to input a signal provided by the first level signal terminal to the first connection node under the control of the potential of pull-up node;

wherein the first suppression module includes a first sub-circuit; the first sub-circuit is electrically connected to the pull-up node, the first connection node and the first level signal terminal respectively, and is configured to input the signal inputted by the first level signal terminal into the first connection node under the control of the potential of the pull-up node;

wherein the first pull-down node control module is electrically connected to the second connection node, and is configured to input the signal provided by the second signal terminal to the first pull-down control node under the control of the second signal terminal, and control to connect the first pull-down control node and the second connection node under the control of the potential of the pull-up node;

the first suppression module is also electrically connected to the second connection node, is configured to input the signal provided by the first level signal terminal to the second connection node under the control of the potential of the pull-up node;

wherein the first pull-down node control module and the first suppression module are independent of each other and are connected via the first connection node;

wherein the first signal terminal and the second signal terminal are different signal terminals; and wherein the gate drive circuit comprises a plurality of transistors, and a structure of each of the transistors is a single-gate structure;

the driving method of the display panel includes:

during at least a part of the conversion phase, inputting an active level to the second signal terminal under the control of a trigger signal, so that the first pull-down node control module controls to pull up the potential of the first pull-down node.

18. The method according to claim 17, comprising:

during the conversion phase, inputting the active level to the second signal terminal under the control of the trigger signal;

wherein the gate driving circuit further comprises a second pull-down node control module; the method further comprises:

when the active level is inputted to the second signal terminal, controlling, by the second pull-down node control module, to pull up the potential of the second node;

or wherein the inputting an active level to the second signal terminal under the control of a trigger signal includes:

converting the trigger signal from a first voltage signal to a second voltage signal, to control to input the active level to the second signal terminal.

* * * * *